United States Patent
Hirotani et al.

(10) Patent No.: US 11,018,616 B2
(45) Date of Patent: May 25, 2021

(54) ELECTRIC DRIVING APPARATUS AND ELECTRIC POWER STEERING APPARATUS

(71) Applicant: Mitsubishi Electric Corporation, Tokyo (JP)

(72) Inventors: Yu Hirotani, Tokyo (JP); Kazumasa Ito, Tokyo (JP); Yusuke Morita, Tokyo (JP); Yuji Takizawa, Tokyo (JP); Satoru Akutsu, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 33 days.

(21) Appl. No.: 16/478,171

(22) PCT Filed: Jan. 26, 2017

(86) PCT No.: PCT/JP2017/002818
§ 371 (c)(1),
(2) Date: Jul. 16, 2019

(87) PCT Pub. No.: WO2018/138846
PCT Pub. Date: Aug. 2, 2018

(65) Prior Publication Data
US 2019/0363663 A1 Nov. 28, 2019

(51) Int. Cl.
*H02P 6/14* (2016.01)
*H02P 29/02* (2016.01)
(Continued)

(52) U.S. Cl.
CPC ............ *H02P 29/02* (2013.01); *B62D 5/0403* (2013.01); *B62D 5/0463* (2013.01); *H02K 1/16* (2013.01);
(Continued)

(58) Field of Classification Search
CPC .. B62D 5/0403; B62D 5/0424; B62D 5/0463; H02K 11/33; H02K 1/16; H02K 1/27;
(Continued)

(56) References Cited

U.S. PATENT DOCUMENTS

| 2012/0038237 A1* | 2/2012 | Li ................. H02K 1/2773 310/156.45 |
| 2014/0145547 A1* | 5/2014 | Nakano ............ H02K 21/16 310/216.069 |
| 2016/0006387 A1* | 1/2016 | Nakamura ........... H02P 25/22 701/43 |

FOREIGN PATENT DOCUMENTS

| JP | 2001-157487 A | 6/2001 |
| JP | 2012-39863 A | 2/2012 |

(Continued)

OTHER PUBLICATIONS

International Search Report for PCT/JP2017/002818 dated Apr. 4, 2017 [PCT/ISA/210].

*Primary Examiner* — Eduardo Colon Santana
*Assistant Examiner* — Gabriel Agared
(74) *Attorney, Agent, or Firm* — Sughrue Mion, PLLC; Richard C. Turner

(57) ABSTRACT

In the present electric driving apparatus, coils that constitute a first armature winding and coils that constitute a second armature winding are arranged so as to alternate in a circumferential direction, and a control portion is configured so as to perform single-system driving when one of a first system and a second system fails, the single-system driving stopping driving of an inverter of the system that has failed, and controlling driving of the inverter of the system that has not failed to supply inverter phase currents to an armature winding of the system that has not failed such that the
(Continued)

inverter phase currents are set to a second upper limit value that is greater than a first upper limit value.

11 Claims, 25 Drawing Sheets

(51) Int. Cl.
    *H02K 11/33* (2016.01)
    *B62D 5/04* (2006.01)
    *H02K 1/16* (2006.01)
    *H02K 1/27* (2006.01)
    *H02K 3/28* (2006.01)
    *H02P 25/22* (2006.01)
    *H02P 27/06* (2006.01)

(52) U.S. Cl.
    CPC ............... *H02K 1/278* (2013.01); *H02K 3/28* (2013.01); *H02K 11/33* (2016.01); *H02P 25/22* (2013.01); *H02P 27/06* (2013.01); *B62D 5/0424* (2013.01); *H02K 2213/03* (2013.01)

(58) Field of Classification Search
    CPC ...... H02K 1/278; H02K 2213/03; H02K 3/28; H02P 25/22; H02P 27/06; H02P 29/02; H02P 29/032; H02P 4/00
    USPC .................................................. 318/400.26
    See application file for complete search history.

(56) References Cited

FOREIGN PATENT DOCUMENTS

| | | |
|---|---|---|
| JP | 2016-19330 A | 2/2016 |
| WO | 2013/054439 A1 | 4/2013 |

\* cited by examiner

COMPARATIVE EXAMPLE

COMPARATIVE EXAMPLE

ELECTRIC DRIVING APPARATUS AND ELECTRIC POWER STEERING APPARATUS

CROSS REFERENCE TO RELATED APPLICATIONS

This application is a National Stage of International Application No. PCT/JP2017/002818, filed on Jan. 26, 2017.

TECHNICAL FIELD

The present invention relates to an electric driving apparatus that includes a rotary electric machine and a controlling apparatus and to an electric power steering apparatus to which the electric driving apparatus is mounted.

BACKGROUND ART

In Patent Literature 1, a rotary electric machine controlling apparatus is disclosed that includes a plurality of driving circuits, windings of a polyphase rotary electric machine being divided into a plurality of three-phase groups, the driving circuits being each connected to a respective group, and control being performed such that when the inverter is abnormal, that driving circuit is stopped, and overall load is shared by the remaining normal driving circuits.

CITATION LIST

Patent Literature

Patent Literature 1: Japanese Patent Laid-Open No. 2001-157487 (Gazette)

SUMMARY OF THE INVENTION

Problem to be Solved by the Invention

In the rotary electric machine controlling apparatus according to Patent Literature 1, if inverter phase currents are increased in order to compensate torque during single-system driving, then demagnetizing fields that arise locally in the permanent magnets increase, and one problem has been that irreversible demagnetization may arise in the permanent magnets. Because the amount of magnetic flux from the permanent magnets is reduced if irreversible demagnetization arises in the permanent magnets, torque that is generated in the rotary electric machines decreases, preventing desired torque properties from being achieved.

The present invention aims to solve the above problems and an object of the present invention is to provide an electric driving apparatus and an electric power steering apparatus that enables improvements in output while suppressing the occurrence of irreversible demagnetization of permanent magnets during single-system driving.

Means for Solving the Problem

An electric driving apparatus according to the present invention includes: a rotary electric machine that includes: a stator that includes: a stator core in which a plurality of teeth are arranged in a circumferential direction such that each protrudes radially inward from an inner circumferential surface of an annular core back; and a first armature winding and a second armature winding that are configured by connecting a plurality of coils that are wound into concentrated windings on each of the teeth, the first armature winding and the second armature winding not being connected to each other electrically; a rotor that includes: a plurality of permanent magnets that are disposed in a circumferential direction so as to be spaced apart from each other, and so as to have directions of magnetization oriented in the circumferential direction; a plurality of field pole portions that are disposed between respective adjacent pairs of permanent magnets; and a plurality of nonmagnetic portions that are disposed on a radially inner side of the permanent magnets so as to contact each of the plurality of permanent magnets, the rotor being disposed radially inside the stator core so as to have a magnetic air gap portion interposed; and a controlling apparatus that includes: a first inverter that supplies inverter phase currents to the first armature winding; a second inverter that supplies inverter phase currents to the second armature winding; and a control portion that controls driving of the first inverter and the second inverter. Coils that constitute the first armature winding and coils that constitute the second armature winding are arranged so as to alternate in the circumferential direction. The control portion is configured so as to: perform two-system driving when a first system that comprises said first armature winding and said first inverter and a second system that comprises said second armature winding and said second inverter are normal, said two-system driving controlling driving of said first inverter and said second inverter to supply said inverter phase currents to said first armature winding and said second armature winding such that said inverter phase currents are set to a first upper limit value, and perform single-system driving when one of said first system and said second system fails, said single-system driving stopping driving of said inverter of said system that has failed, and controlling driving of said inverter of said system that has not failed to supply said inverter phase currents to said armature winding of said system that has not failed such that said inverter phase currents are set to a second upper limit value that is greater than said first upper limit value.

Effects of the Invention

According to the present invention, if one inverter fails, because the generation of demagnetizing fields in the permanent magnets can be suppressed while compensating torque by increasing the inverter phase currents that are supplied to the normal inverter, irreversible demagnetizing of the permanent magnets can be suppressed during single-system driving. It thereby becomes possible to supply larger inverter phase currents to the rotary electric machine within a range that does not generate irreversible demagnetization in the permanent magnets, enabling increased output from the rotary electric machine to be achieved.

DESCRIPTION OF EMBODIMENTS

Respective embodiments of the electric driving apparatus according to the present invention will now be explained with reference to the drawings, and identical or corresponding members and portions in each of the figures will be explained using identical numbering.

Embodiment 1

Figure 1:
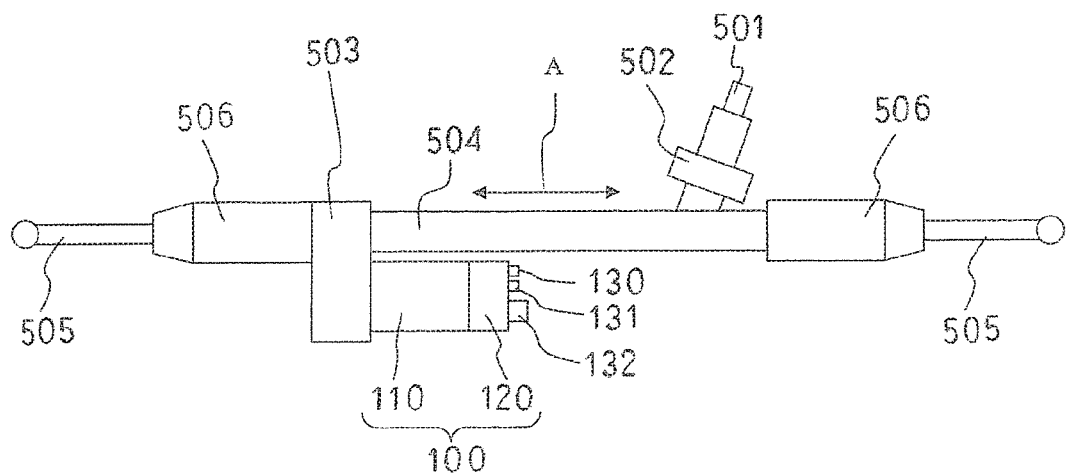
FIG. 1 is a configuration diagram that shows an automotive electric power steering apparatus to which an electric driving apparatus according to Embodiment 1 of the present invention is mounted.
Figure 2:
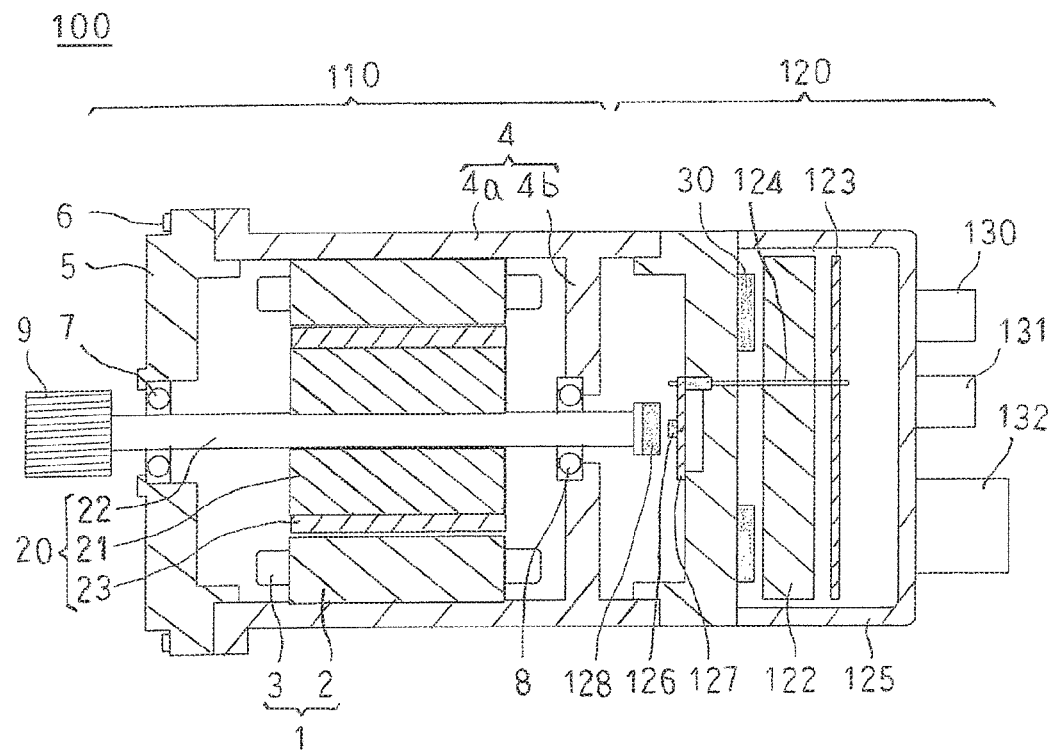
FIG. 2 is a longitudinal cross section that shows the electric driving apparatus according to Embodiment 1 of the present invention.
Figure 3:
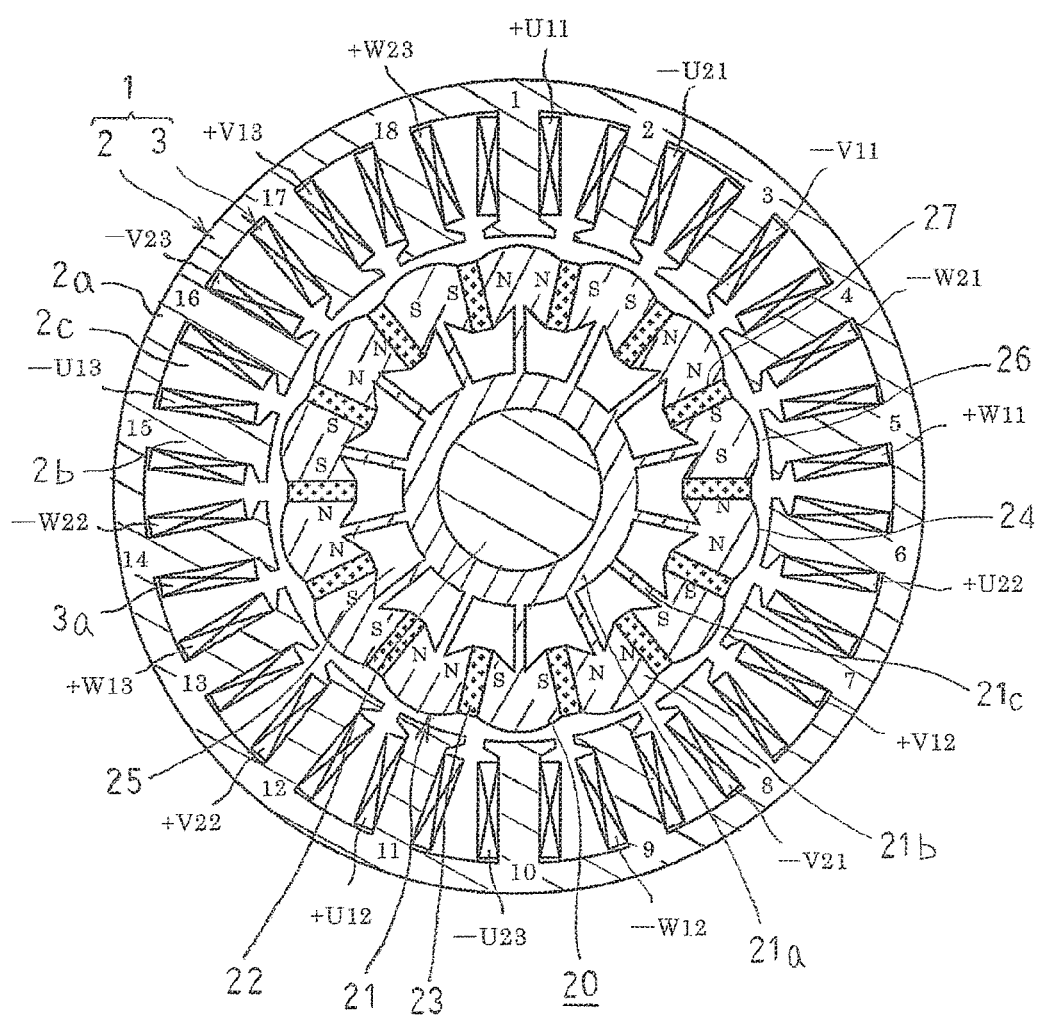
FIG. 3 is a lateral cross section that shows a rotary electric machine in the electric driving apparatus according to Embodiment 1 of the present invention.
Figure 4:
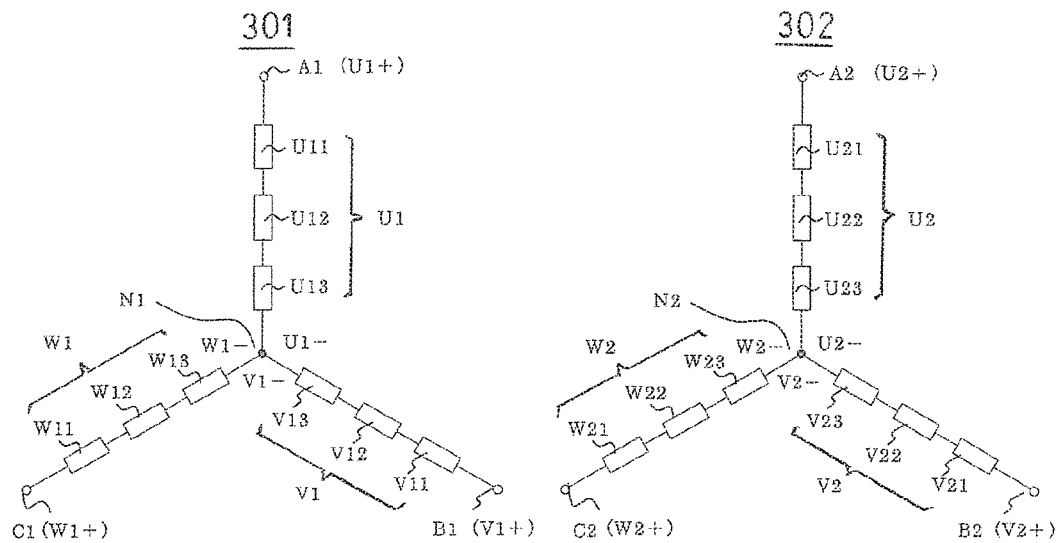
FIG. 4 is a schematic diagram that explains a first connecting method for an armature winding of the rotary electric machine in the electric driving apparatus according to Embodiment 1 of the present invention.
Figure 5:
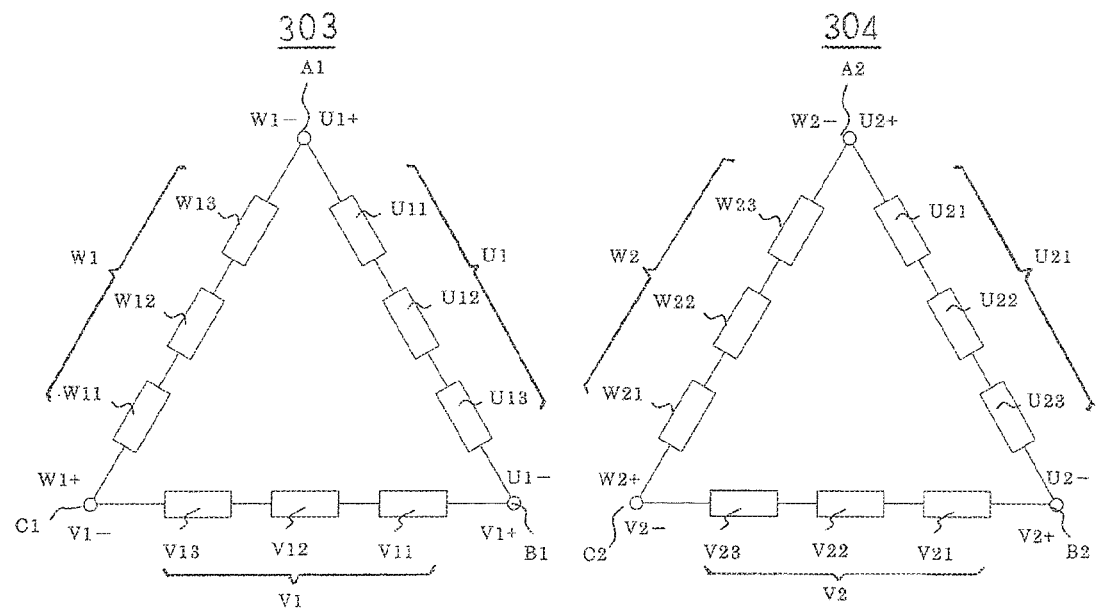
FIG. 5 is a schematic diagram that explains a second connecting method for an armature winding of the rotary electric machine in the electric driving apparatus according to Embodiment 1 of the present invention.

FIG. 1 is a configuration diagram that shows an automotive electric power steering apparatus to which an electric driving apparatus according to Embodiment 1 of the present invention is mounted, FIG. 2 is a longitudinal cross section that shows the electric driving apparatus according to Embodiment 1 of the present invention, FIG. 3 is a lateral cross section that shows a rotary electric machine in the electric driving apparatus according to Embodiment 1 of the present invention, FIG. 4 is a schematic diagram that explains a first connecting method for an armature winding of the rotary electric machine in the electric driving apparatus according to Embodiment 1 of the present invention, and FIG. 5 is a schematic diagram that explains a second connecting method for an armature winding of the rotary electric machine in the electric driving apparatus according to Embodiment 1 of the present invention. Moreover, a "longitudinal cross section" is a cross section in a plane that includes a central axis of a rotating shaft, and a "lateral cross section" is a cross section in a plane that is perpendicular to the central axis of the rotating shaft.

First, the electric power steering apparatus will be explained with reference to FIG. 1.

When a driver steers a steering wheel (not shown), torque therefrom is transmitted to a shaft 501 by means of a steering column (not shown). Here, the torque that is transmitted to the shaft 501 is detected by a torque sensor 502, and is converted into electrical signals, which are transmitted through cables (not shown) by means of a first connector 130 to a controlling apparatus 120 of an electric driving apparatus 100. At the same time, vehicle information such as vehicle speed is converted to electrical signals, which are transmitted to the controlling apparatus 120 by means of a second connector 131. The controlling apparatus 120 computes the required assisting torque from that torque and the vehicle information such as the vehicle speed, and supplies electric current to the rotary electric machine 110 through inverters inside the controlling apparatus 120.

The rotary electric machine 110 is disposed such that a central axis is oriented parallel to a direction of movement A of a rack shaft. Electric power supply to the controlling apparatus 120 is fed by means of an electric power supply connector 132 from an electric power source or an alternator. Torque that is generated by the rotary electric machine 110 is reduced by a gear box 503 into which belts (not shown) and ball screws (not shown) are mounted internally, to generate thrust that moves the rack shaft (not shown) that is inside the housing 504 in the direction of the arrows A to assist the steering force of the driver. Tie rods 505 thereby move, enabling the tires to be steered and the vehicle turned. The driver is assisted by the torque from the rotary electric machine 110, enabling the vehicle to be turned using a reduced steering force. Moreover, a rack boot 506 is disposed so as to prevent foreign matter from entering the apparatus.

Here, the rotary electric machine 110 and the controlling apparatus 120 of the electric driving apparatus 100 are configured so as to be integrated with each other.

As shown in FIG. 2, the rotary electric machine 110 includes: a stator 1 that has: an annular stator core 2; and an armature winding 3 that is mounted to the stator core 2; a frame 4 that fixes the stator core 2; and a rotor 20. The frame 4 is produced so as to have a floored cylindrical shape that is constituted by: a cylindrical portion 4a; and a floor portion 4b that closes an opening at a first end of the cylindrical portion 4a. A vicinity of an opening of the cylindrical portion 4a of the frame 4 is fixed by being fastened to a disk-shaped housing 5 that is disposed on a front surface portion of the rotary electric machine 110 using bolts 6. The stator core 2b of the stator 1 is fixed inside the cylindrical portion 4a by press-fitting, shrink-fitting, etc.

The rotor 20 has: a rotor core 21; a rotating shaft 22 that is inserted into and fixed to a central position of the rotor core 21; and permanent magnets 23 that are fixed to the rotor core 21. The rotating shaft 22 is rotatably held in bearings 7 and 8 that are disposed on the housing 5 and the floor portion 4b. The rotor 20 is thereby rotatably disposed inside the stator 1 so as to have a magnetic air gap portion 26 interposed. The pulley 9 is fixed to an end of the rotating shaft 22 that projects from the housing 5. Moreover, the bearing 7 is supported by a wall portion that is disposed integrally or as a separate body.

Next, a configuration of the rotor 20 will be explained with reference to FIG. 3.

The rotor core 21 includes: an annular portion 21a into which the rotating shaft 22 is inserted and fixed; fourteen field pole portions 21b that are arranged at a uniform angular pitch circumferentially around an outer circumference of the annular portion 21a; and bridge portions 21c that mechanically link each of the field pole portions 21b and the annular portion 21a. Magnet-embedding portions 27 are formed between each adjacent pair of field pole portions 21b.

The permanent magnets 23 are produced so as to have rod-shaped bodies that have rectangular cross sections, and are fixed to the rotor core 21 so as to be housed in each of the magnet-embedding portions 27. Here, the permanent magnets 23 are disposed on the rotor core 21 such that a radial length is longer than a circumferential length. The permanent magnets 23 have a direction of magnetization in a circumferential direction, and are magnetized such that polarity of facing surfaces of circumferentially adjacent permanent magnets 23 is identical, in other words, such that North-seeking (N) poles face each other, and South-seeking (S) poles face each other. The rotor 20 that is configured in this manner has fourteen field poles.

Because the permanent magnets 23 are rod-shaped bodies that have rectangular cross sections in this manner, machining costs for the permanent magnets 23 can be reduced. Furthermore, because the polarity of the facing surfaces of the circumferentially adjacent permanent magnets 23 is identical, magnetic flux can be concentrated in the rotor core 21, increasing magnetic flux density, enabling high torque to be achieved.

Moreover, a single permanent magnet 23 is housed in each of the magnet-embedding portions 27, but a plurality of magnet blocks may be housed in each of the magnet-embedding portions 27. In that case, a plurality of magnet blocks that have identical directions of magnetization are housed in each of the magnet-embedding portions 27.

The field pole portions 21*b* that are positioned between the adjacent permanent magnets 23 are formed into curved surface portions 24 that have curved surfaces that have a radially outwardly convex shape such that an air gap length between the stator 1 and the field pole portions 21*b* is shorter at a halfway point between the adjacent permanent magnets 23. Because the waveform of the magnetic flux density that is generated in the magnetic air gap portion 26 between the stator 1 and the rotor 20 can be smoothed by adopting such a shape, cogging torque and torque ripples can be reduced.

Nonmagnetic portions 25 are disposed so as to contact end surfaces on radially inner sides of the permanent magnets 23. Here, penetrating apertures are formed so as to pass axially through portions on the radially inner sides of the permanent magnets 23 of the rotor core 21 to constitute the nonmagnetic portions 25 using air, but nonmagnetic portions 25 may be formed by filling the penetrating apertures with a resin, or nonmagnetic portions 25 may be formed by inserting a nonmagnetic metal such as a stainless alloy or aluminum into the penetrating apertures. Magnetic leakage flux from the permanent magnets 23 can be reduced by disposing the nonmagnetic portions 25 in this manner.

In this case, all of the field pole portions 21*b* between the adjacent permanent magnets 23 are linked by the bridge portions 21*c* to the annular portion 21*a* that is disposed so as to surround the outer circumference of the rotating shaft 22, but some of the field pole portions 21*b* may alternatively not be linked to the annular portion 21*a*. In that case, magnetic leakage flux that passes through between the field pole portions 21*b* that are not linked to the annular portion 21*a* and the annular portion 21*a* is reduced, enabling average torque to be improved.

In the rotor 20 that is configured in this manner, because the outer circumferential surfaces of the field pole portions 21*b* of the rotor core 21 are formed so as to have curved surface portions 24 that are radially outwardly convex, the waveform of the magnetic flux density that is generated in the magnetic air gap portion 26 between the stator 1 and the rotor can be smoothed. In addition, because the radial length of the permanent magnets 23 is greater than the circumferential length, the magnetic flux can be concentrated in the rotor core 21. Increased torque can thereby be achieved while reducing cogging torque and torque ripples.

Because permanent magnets 23 that have rectangular cross sections can be used, machining costs of the permanent magnets 23 are reduced. Metal tubes for preventing magnet scattering are no longer required. Thus, reductions in the cost of the rotary electric machine can be achieved.

Here, a permanent magnet 23 is housed in each of fourteen magnet-embedding portions 27 that are formed at a uniform angular pitch circumferentially, but permanent magnets 23 may be housed in alternate magnet-embedding portions 27. In that case, the number of magnetic field poles in the rotor is made fourteen by each of the permanent magnets 23 being magnetized such that the facing surfaces of the circumferentially adjacent permanent magnets 23 have different polarity. In other words, a rotor that uses seven permanent magnets 23 can achieve similar or identical effects to a rotor that uses fourteen permanent magnets 23. Thus, the number of permanent magnets 23 can be reduced, enabling costs for manufacturing the rotor to be reduced. Moreover, in that case, each of the permanent magnets 23 can also be configured using a plurality of magnet blocks that have identical directions of magnetization.

Next, a configuration of the stator 1 will be explained with reference to FIG. 3.

The stator 1 includes: a stator core 2 that has: an annular core back 2*a*; and eighteen teeth 2*b* that extend radially inward from the core back 2*a*, the stator core 2 being configured by laminating electromagnetic steel sheets, for example; and an armature winding 3 that includes eighteen coils 3*a* that are wound into concentrated windings on each of the teeth 2*b*. Thus, slots 2*c* are formed between the adjacent teeth 2*b*. Insulators (not shown) that are produced using a resin, etc., are inserted between the coils 3*a* and the teeth 2*b* to ensure electrical insulation between the coils 3*a* and the teeth 2*b*.

In FIG. 3, numbering 1 through 18 has been allotted to the teeth 2*b* in order of circumferential arrangement for simplicity. Numbers are additionally applied to the coils 3*a* that are wound onto each of the teeth 2*b* for simplicity so as to represent and identify which coil belongs to which phase among a U phase, a V phase, and a W phase. The U phase is constituted by six coils 3*a*, i.e., +U11, −U21, +U22, −U23, +U12, and −U13, the V phase is constituted by six coils 3*a*, i.e., −V11, +V12, −V21, +V22, −V23, and +V13, and the W phase is constituted by six coils 3*a*, i.e., −W21, +W11, −W12, +W13, −W22, and +W23. As shown in FIG. 3, the eighteen coils 3*a* line up sequentially in order of +U11, −U21, −V11, −W21, +W11, +U22, +V12, −V21, −U23, +U12, +V22, +W13, −W22, −U13, −V23, +V13, and +W23 so as to correspond to each of the teeth 2*b* that have numbering 1 through 18. Moreover, "+" and "−" indicate winding polarities of the coils 3*a*, the "+" winding polarity being opposite to the "−" winding polarity. The number of turns in all of the coils 3*a* is identical.

Next, first and second connecting methods for the eighteen coils 3*a* will be explained with reference to FIGS. 4 and 5.

+U11, +U12, and −U13 are connected in series to constitute a U1 phase which is a first U-phase winding. −U21, +U22, and −U23 are connected in series to constitute a U2 phase which is a second. U-phase winding. −V11, +V12, and +V13 are connected in series to constitute a V1 phase which is a first V-phase winding. −V21, +V22, and −V23 are connected in series to constitute a V2 phase which is a second V-phase winding. +W11, −W12, and +W13 are connected in series to constitute a phase which is a first W-phase winding. −W21, −W22, and +W23 are connected in series to constitute a W2 phase which is a second W-phase winding.

A U11 end portion of the U1 phase is U1+, and a U13 end portion is U1−, and similarly a U21 end portion of the U2 phase is U2+, and a U23 end portion is U2−. A V11 end portion of the V1 phase is V1+, and a V13 end portion is V1−, and similarly a V21 end portion of the V2 phase is V2+, and a V23 end portion is V2−. A W11 end portion of the phase is W1+, and a W13 end portion is W1−, and a W21 end portion of the U2 phase is W2+, and a W23 end portion is W2−.

In the first connecting method, as shown in FIG. 4, U1−, V1−, and W1− are electrically connected to configure a first armature winding 301 that is formed by wye-connecting the U1 phase, the V1 phase, and the W1 phase. The connected portion at U1−, V1−, and W1− becomes a neutral point N1 of the first armature winding 301, and U1+, V1+, and W1+ become output terminals A1, B1, and C1 of the first armature winding 301. U2−, V2−, and W2− are similarly electrically connected to configure a second armature winding 302 that is formed by wye-connecting the U2 phase, the V2 phase, and the W2 phase. The connected portion at U2−, V2−, and W2− becomes a neutral point N2 of the second armature winding 302, and U2+, V2+, and W2+ become output terminals A2, B2, and C2 of the second armature winding 302. In this manner, the armature winding 3 is constituted by the first armature winding 301 and the second armature winding 302. Moreover, the first armature winding 301 and the second armature winding 302 are not electrically connected.

In the second connecting method, as shown in FIG. 5, U1− and W1− are electrically connected, U1− and V1+ are electrically connected, and V1− and W1+ are electrically connected to configure a first armature winding 303 that is formed by delta-connecting the U1 phase, the V1 phase, and the phase. The connected portion at U1− and W1−, the connected portion at U1− and V1+, and the connected portion at V1− and W1+ become output terminals A1, B1, and C1 of the first armature winding 303. Similarly, U2+ and W2− are electrically connected, U2− and V2+ are electrically connected, and V2− and W2+ are electrically connected to configure a second armature winding 304 that is formed by delta-connecting the U2 phase, the V2 phase, and the W2 phase. The connected portion at U2+ and W2−, the connected portion at U2− and V2+, and the connected portion at V2− and W2+ become output terminals A2, B2, and C2 of the second armature winding 304. In this manner, the armature winding 3 is constituted by the first armature winding 303 and the second armature winding 304. Moreover, the first armature winding 303 and the second armature winding 304 are not electrically connected.

In this manner, the armature winding 3 may be constituted by the first armature winding 301 and the second armature winding 302 that are formed by the first connecting method, or may be constituted by the first armature winding 303 and the second armature winding 304 that are formed by the second connecting method.

Now, in the armature winding 3, as shown in FIG. 3, the coils 3a that are included in the first armature winding 301 or 303 and the coils 3a that are included in the second armature winding 302 or 304 are disposed so as to alternate circumferentially. Because single coils 3a are wound onto single teeth 2b, manufacturing of the stator 1 is facilitated. Because a plurality of coils 3a are not wound onto single teeth 2b, magnetic interference between the first armature winding 301 or 303 and the second armature winding 302 or 304 can be effectively suppressed.

Because the number of coils 3a that constitute each of the phases in the first armature winding 301 or 303 and the second armature winding 302 or 304, and the parallel or series relationships of the coils 3a that constitute each of the phases are similar or identical, capacities of the inverters that are connected to the first armature winding 301 or 303 and the second armature winding 302 or 304 can be made equal. In addition, because the number of series conductors of the coils 3a that constitute each of the phases in the first armature winding 301 or 303 and the second armature winding 302 or 304 is identical, capacities of the inverters that are connected to the first armature winding 301 or 303 and the second armature winding 302 or 304 can be made even closer to equal.

The rotary electric machine 110 that is configured in this manner is a 14-pole 18-tooth rotary electric machine.

Next, the controlling apparatus 120 will be explained with reference to FIG. 2.

As shown in FIG. 2, disposed in the controlling apparatus 120 are: a first connector 130 that receives the signals from the torque sensor 502; a second connector 131 that receives vehicle information such as vehicle speed; and an electric power supply connector 132 for electric power supply.

In addition, there are inverters for driving the rotary electric machine 110 in the controlling apparatus 120, and the inverters have switching elements 30 such as metal oxide semiconductor field-effect transistors (MOSFETs). These switching elements 30 generate heat because electric current for driving the motor flows therethrough. Thus, the switching elements 30 have a construction in which heat is radiated by being placed in contact with a heatsink 121 so as to have an adhesive or insulating sheets interposed. The heatsink 121 is fitted together with the frame 4 using shrink-fitting, and is configured such that heat from the switching elements 30 is transferred to the frame 4 through the heatsink 121. In addition to the switching elements 30, there are smoothing capacitors, coils for noise reduction, electric power supply relays, busbars that connect these electrically, etc., in the inverters, but these have been omitted from FIG. 2. An intermediate member 122 is configured by molding busbars together with a resin.

A controlling circuit board 123 is disposed inside the controlling apparatus 120 so as to be adjacent to the intermediate member 122, and this controlling circuit board 123 sends controlling signals to the switching elements 30 in order to drive the rotary electric machine 110 appropriately, based on the information that is received through the first connector 130 and the second connectors 131. The controlling signals are transmitted by connecting members 124 that electrically connect the controlling circuit board 123 and the switching elements 30. These connecting members 124 are connected to the controlling circuit board 123 and the switching elements 30 by press-fitting, or soldering, etc. The inverters and the controlling circuit board 123 are covered by a case 125. The case 125 may be made of a resin, or may be made of a metal such as aluminum, etc., or may have a configuration in which a resin and a metal such as aluminum, etc., are combined. The controlling circuit board 123 is disposed so as to lie in a plane that is perpendicular to the rotating shaft 22 of the rotary electric machine 110.

A rotation sensor 126 is a magnetic sensor element that detects a magnetic field, and is fixed to a circuit board 127 by soldering, etc. The rotation sensor 126 is disposed at a position that is coaxial with and faces the rotating shaft 22 of the rotary electric machine 110, and detects a magnetic field that is generated by the rotation sensor permanent magnet 128 to detect an angle of rotation of the rotor 20 of the rotary electric machine 110 by finding the orientation thereof. The controlling apparatus 120 supplies an appropriate driving current to the rotary electric machine 110 in response to this angle of rotation.

Figure 6:
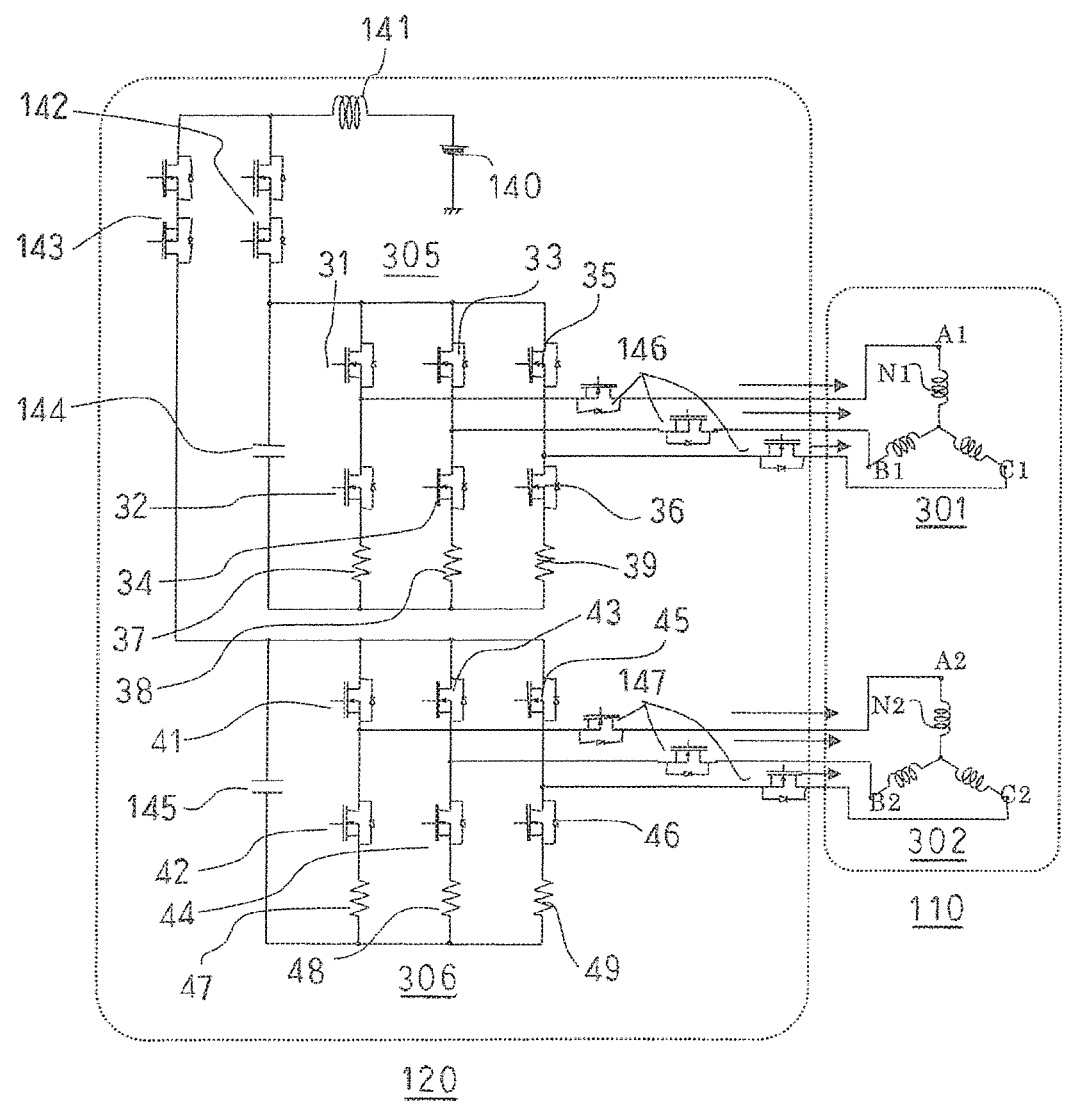
FIG. 6 is a circuit diagram for the electric driving apparatus according to Embodiment 1 of the present invention.

Next, a circuit configuration of the electric driving apparatus 100 will be explained with reference to FIG. 6. FIG. 6 is a circuit diagram for the electric driving apparatus according to Embodiment 1 of the present invention. Moreover, in FIG. 6, for simplicity, only the armature winding of the rotary electric machine 110 is depicted, and only the power circuit portions of the inverters of the controlling apparatus 120 are shown.

The rotary electric machine 110 is a motor in which the number of poles is fourteen, and the number of teeth is eighteen. The armature winding 3 of the rotary electric machine 110 is constituted by: a first armature winding 301 that is configured by wye-connecting a U1 phase, a V1 phase, and a W1 phase; and a second armature winding 302 that is configured by wye-connecting a U2 phase, a V2 phase, and a W2 phase. The controlling apparatus 120 includes: a first inverter 305 that supplies three-phase electric current to the first armature winding 301; and a second inverter 306 that supplies three-phase electric current to the second armature winding 302. Moreover, the armature winding 3 may alternatively be constituted by: a first armature winding 303 that is configured by delta-connecting a U1 phase, a V1 phase, and a W1 phase; and a second armature winding 302 that is configured by delta-connecting a U2 phase, a V2 phase, and a W2 phase.

Direct-current power is supplied to the first inverter 305 and the second inverter 306 from an electric power supply 140, via a noise reduction coil 141, a first electric power supply relay 142, and a second electric power supply relay 143. Moreover, in FIG. 6, the electric power supply 140 is depicted as if it were inside the controlling apparatus 120, but the electric power supply 140 is actually an external electric power supply, and the direct-current power is supplied to the controlling apparatus 120 by means of an electric power supply connector 132, as shown in FIG. 2. The first electric power supply relay 142 and the second electric power supply relay 143 are each constituted by two MOSFETs, and open during failure, etc., to prevent excessive electric current from flowing. Here, the electric power supply 140, the coil 141, the first electric power supply relay 142, and the second electric power supply relay 143 are connected in that order, but they may be connected in order of the electric power supply 140, the first electric power supply relay 142, the second electric power supply relay 143, and the coil 141.

The first inverter 305 and the second inverter 306 are configured into bridge circuits using six MOSFETs each as the switching elements 30. Single smoothing capacitors 144 and 145 are connected in parallel to the first inverter 305 and the second inverter 306, respectively. Here, single smoothing capacitors 144 and 145 are connected in parallel to the first inverter 305 and the second inverter 306, respectively, but a plurality of smoothing capacitors 144 and 145 may be connected in parallel to the first inverter 305 and the second inverter 306, respectively.

The first inverter 305 is configured by connecting in parallel a MOSFET 31, and a MOSFET 32 that are connected in series, a MOSFET 33 and a MOSFET 34 that are connected in series, and a MOSFET 35 and a MOSFET 36 that are connected in series. Electric current value detecting shunt resistors 37, 38, and 39 are connected on a ground side of each of lower MOSFETs 32, 34, and 36. A smoothing capacitor 144 is connected to the first inverter 305 in parallel. Moreover, the shunt resistors 37, 38, and 39 are connected on a ground side of three MOSFETs 32, 34, and 36, but the shunt resistors may be connected on a ground side of two MOSFETs or one MOSFET.

The direct-current power from the electric power supply 140 is converted to alternating current by the first inverter 305. As indicated by arrows in FIG. 6, the alternating-current power that is converted by the first inverter 305 is supplied from a connecting portion between the MOSFET 31 and the MOSFET 32 to the terminal. A1 of the first armature winding 301 by means of a busbar, from a connecting portion between the MOSFET 33 and the MOSFET 34 to the terminal B1 of the first armature winding 301 by means of a busbar, and from a connecting portion between the MOSFET 35 and the MOSFET 36 to the terminal C1 of the first armature winding 301 by means of a busbar.

First motor relays 146 are disposed on each of the wiring pathways that connect the first inverter 305 and the terminals A1, B1, and C1 of the first armature winding 301. Thus, during failure of the first inverter 305, the first motor relays 146 open such that the rotary electric machine 110 and the first inverter 305 are electrically isolated.

The second inverter 306 is configured by connecting in parallel a MOSFET 41 and a MOSFET 42 that are connected in series, a MOSFET 43 and a MOSFET 44 that are connected in series, and a MOSFET 45 and a MOSFET 46 that are connected in series. Electric current value detecting shunt resistors 47, 48, and 49 are connected on a ground side of each of lower MOSFETs 42, 44, and 46. A smoothing capacitor 145 is connected to the second inverter 306 in parallel. Moreover, the shunt resistors 47, 48, and 49 are connected on a ground side of three MOSFETs 42, 44, and 46, but the shunt resistors may be connected on a ground side of two MOSFETs or one MOSFET.

The direct-current power from the electric power supply 140 is converted to alternating current by the second inverter 306. As indicated by arrows in FIG. 6, the alternating-current power that is converted by the second inverter 306 is supplied from a connecting portion between the MOSFET 41 and the MOSFET 42 to the terminal A2 of the second armature winding 302 by means of a busbar, from a connecting portion between the MOSFET 43 and the MOSFET 43 to the terminal B2 of the second armature winding 302 by means of a busbar, and from a connecting portion between the MOSFET 45 and the MOSFET 46 to the terminal C2 of the second armature winding 302 by means of a busbar.

Second motor relays 147 are disposed on each of the wiring pathways that connect the second inverter 306 and the terminals A2, 132, and C2 of the second armature winding 302. Thus, during failure of the second inverter 306, the second motor relays 147 open such that the rotary electric machine 110 and the second inverter 306 are electrically isolated.

In this manner, a first system that includes the first electric power supply relay 142, the first inverter 305, the first motor relays 146, and the first armature winding 301, and a second system that includes the second electric power supply relay 143, the second inverter 306, the second motor relays 147, and the second armature winding 302 are configured in the electric driving apparatus 100. The MOSFETs 31 through 36 and 41 through 46 of the first inverter 305 and the second inverter 306 are switched by signals that are transmitted from the controlling circuit board 123 in response to the angle of rotation that is detected by the rotation sensor 126 that is included in the rotary electric machine 110. The desired three-phase electric current is thereby supplied to the first armature winding 301 and the second armature winding 302 to generate torque in the rotor 20.

Moreover, a magnetic sensor is used as a rotation sensor 126, but the rotation sensor 126 is not limited to the magnetic sensor, and a configuration in which a permanent magnet and a giant magnetoresistive (GMR) sensor or an anisotropic magnetoresistive (AMR) sensor are combined, or a resolver, etc., may be used, for example.

Here, the neutral point N1 of the first armature winding 301 and the neutral point N2 of the second armature winding 302 are not electrically connected. Thus, even if short-circuiting arises in either the first inverter 305 or the second inverter 306, the influence of the short-circuiting can be reduced because torque can be generated by supplying electric power to the armature winding of the normal inverter.

Figure 7:
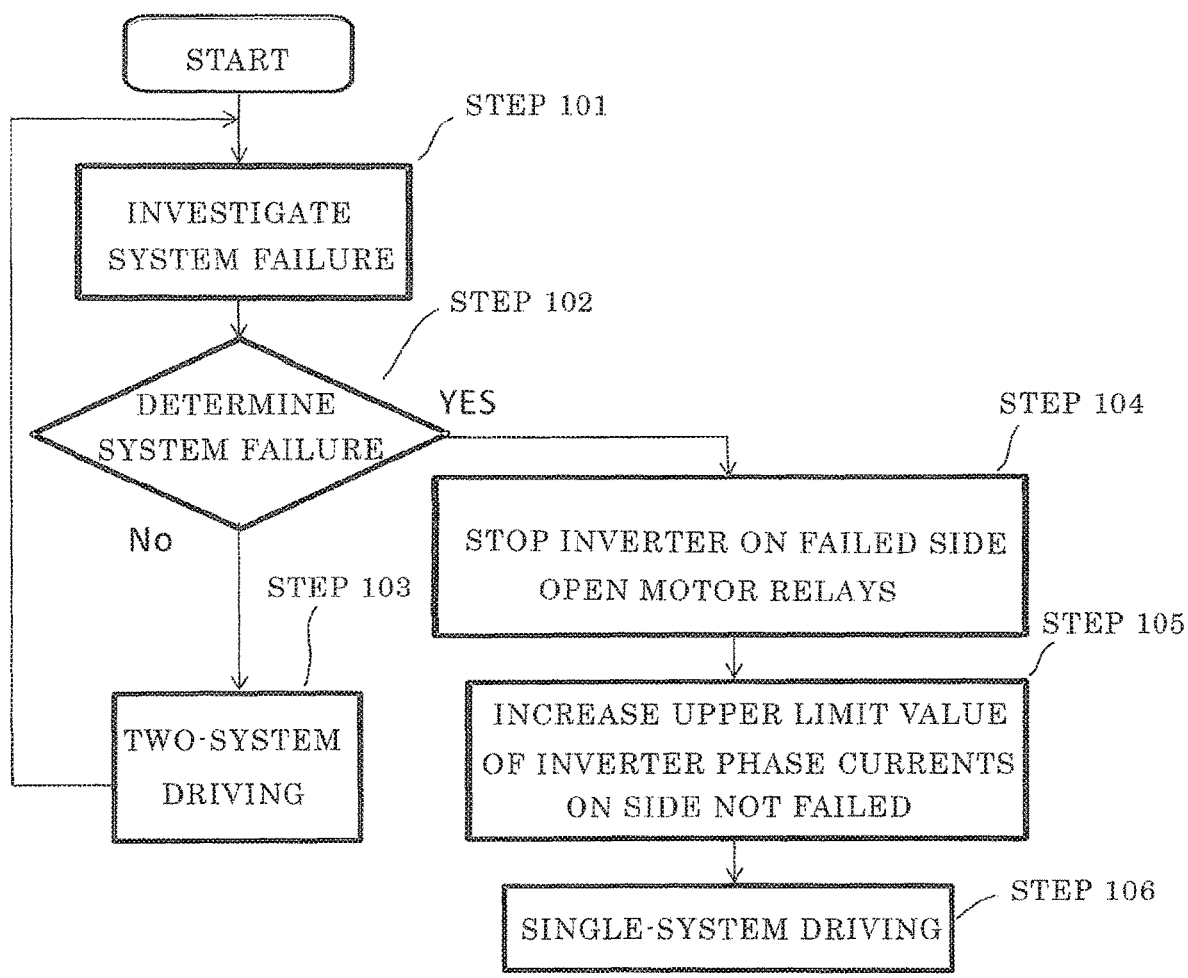
FIG. 7 is a diagram that explains operation of a controlling means in the electric driving apparatus according to Embodiment 1 of the present invention.

Next, operation of the control portion in the controlling apparatus 120 will be explained based on FIG. 7. FIG. 7 is a diagram that explains operation of a controlling means in the electric driving apparatus according to Embodiment 1 of the present invention. Here, a central processing unit (CPU)

is mounted onto the controlling circuit board 123, and operates as the control portion of the controlling apparatus 120.

The controlling circuit board 123 first investigates failure of the inverters and the armature windings, in other words, the systems, from information such as electric current detected values from the shunt resistors, detected values of three-phase voltages, detected values of bus voltages, gate signals from the MOSFETs, etc., (Step 101). Next, the controlling circuit board 123 performs a determination concerning failure of the systems based on the results of that investigation (Step 102). If failure of the systems is not detected at Step 102, the controlling circuit board 123 proceeds to Step 103, and performs two-system driving using the first inverter 305 and the second inverter 306. In other words, inverter phase currents are supplied to both the first armature winding 301 and the second armature winding 302 from the first inverter 305 and the second inverter 306.

If failure of the systems is detected at Step 102, the controlling circuit board 123 proceeds to Step 104, stops the inverter of the system that has failed, and opens all the motor relays of the system that has failed. Next, an upper limit value of the inverter phase current of the system that has not failed is increased (Step 105), and single-system driving is performed using the inverter of the system that has not failed (Step 106). In other words, the inverter phase current is supplied from the inverter of the system that has not failed to the armature winding of the system that has not failed.

By this operation, braking torque and torque pulsation that arise due to the inverter phase current that is supplied from the inverter of the system that has failed and cyclic currents that pass through the inverter of the system that has failed are suppressed. Safety during system failure of the electric driving apparatus 100 is improved thereby.

Next, two-system driving and single-system driving by the controlling circuit board 123 will be explained. The controlling circuit board 123 performs vector control over the rotary electric machine 110 in two-system driving and single-system driving. The magnetic flux vectors that arise due to the permanent magnets 23 are in a d direction when the magnetic flux of the rotary electric machine 110 is separated into a dq axial coordinate system that rotates in synchronization with the rotor 20. Here, the controlling circuit board 123 performs flux-weakening control by passing the inverter phase currents to the armature windings in phases such that the above-mentioned magnetic flux vectors that arise due to the armature winding are reversed so as to be inverted by 180 degrees from the d-axis direction. By performing flux-weakening control of this kind, the magnetic flux that arises in the permanent magnets 23 can be canceled out.

Figure 8:
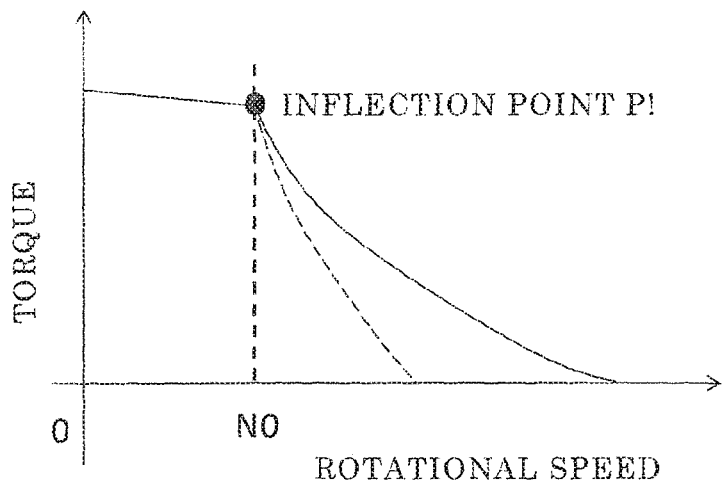
FIG. 8 is a graph that shows a relationship between torque and rotational speed in the rotary electric machine in the electric driving apparatus according to Embodiment 1 of the present invention.

Here, a relationship between torque and rotational speed in the rotary electric machine 110 is shown in FIG. 8. FIG. 8 is a graph that shows a relationship between torque and rotational speed in the rotary electric machine in the electric driving apparatus according to Embodiment 1 of the present invention. In FIG. 8, a solid line represents torque characteristics when flux-weakening control is performed in a region that exceeds an inflection point P1, and a broken line represents torque characteristics when flux-weakening control is not performed in the region that exceeds the inflection point P1.

As indicated by the broken line in FIG. 8, torque decreases rapidly in the rotary electric machine 110 when the rotational speed exceeds N0. In other words, the rotary electric machine 110 has torque characteristics that inflect at a point where the rotational speed is N0. The point where the rotational speed is N0 is inflection point P1. This phenomenon results from the voltage that can be applied to the rotary electric machine 110 reaching a limit at the inflection point P1 due to voltages that arise due to resistance in the first inverter 305, the second inverter 306, and the rotary electric machine 110, etc., rotation of the rotor 20, which includes the permanent magnets 23, and armature reaction that arises in the armature winding 3, etc.

If flux-weakening control is performed in the high rotational frequency region that exceeds the inflection point P1, then the magnetic flux that arises due to the permanent magnets 23 can be canceled out, as described above, enabling the voltages that arise due to rotation of the rotor 20, etc., to be reduced. Since voltage drop can be reduced when flux-weakening control is performed in the high rotational frequency region that exceeds the inflection point P1 in this manner, the voltage that can be applied to the rotary electric machine 110 can be increased, and because of that, the torque of the rotary electric machine 110 can be improved in the high rotational frequency region that exceeds the inflection point P1 compared to when flux-weakening control is not performed in the high rotational frequency region that exceeds the inflection point P1, as indicated by the solid line in FIG. 8.

Moreover, if flux-weakening control is performed, then provided that the amount of magnetic flux that arises in the permanent magnets 23 is not exceeded, the more the amount of magnetic flux in the permanent magnets 23 is reduced, the more likely that voltages that arise due to the rotation of the rotor 20, etc., will be suppressed.

Figure 9:
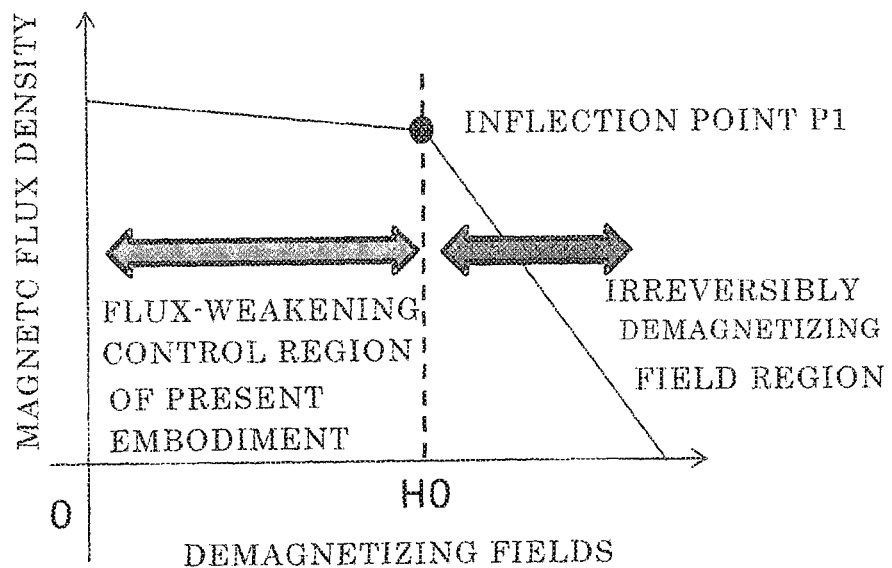
FIG. 9 is a graph that shows a relationship between demagnetizing fields that arise in permanent magnets and magnetic flux density in the permanent magnets in the rotary electric machine of the electric driving apparatus according to Embodiment 1 of the present invention.

Now, if flux-weakening control is performed that generates magnetic flux vectors that are inverted by 180 degrees compared to the magnetic flux vectors of the permanent magnets 23, then reverse magnetic fields (demagnetizing fields) arise relative to the permanent magnets 23, and depending on the material characteristics of the permanent magnets 23, the magnetic flux density that the permanent magnets 23 themselves generate has been known to decrease. A relationship between the demagnetizing fields that arise in the permanent magnets 23 and the magnetic flux density of the permanent magnets 23 is shown in FIG. 9. FIG. 9 is a graph that shows the relationship between demagnetizing fields that arise in permanent magnets and magnetic flux density in the permanent magnets in the rotary electric machine of the electric driving apparatus according to Embodiment 1 of the present invention. In FIG. 9, a horizontal axis represents the demagnetizing field, and a vertical axis represents magnetic flux density.

As shown in FIG. 9, there is a region in which magnetic flux density decreases rapidly if the demagnetizing fields that arise in the permanent magnets 23 exceed a constant threshold value H0 (inflection point P11) that depends on the material characteristics of the permanent magnets 23. Once the demagnetizing fields that arise in the permanent magnets 23 have increased as far as this region, the magnetic flux density of the permanent magnets 23 will not return to previous levels even if the demagnetizing fields are then reduced, and magnetic flux density deteriorates irreversibly, in other words, the permanent magnets 23 demagnetize irreversibly. For simplicity, the range of demagnetizing fields that irreversibly demagnetize the permanent magnets 23 in this manner will be designated an "irreversibly demagnetizing field region". If the demagnetizing fields are applied into the irreversibly demagnetizing field region, torque that arises in the rotary electric machine 110 is reduced since the amount of magnetic flux from the permanent magnets 23 is reduced, and one problem has been that desired torque properties cannot be achieved.

In two-system driving and single-system driving of the controlling apparatus 120 in Embodiment 1, an upper limit value is set on the inverter phase currents while flux-weakening control is being performed such that the demagnetizing fields that arise in the permanent magnets 23 are within a range that does not reach the irreversibly demagnetizing field region. Thus, the permanent magnets 23 do not demagnetize irreversibly, effectively preventing torque from being reduced. In addition, the upper limit value of the inverter phase current is set so as to increase the maximum value of the demagnetizing fields that arise in the permanent magnets 23 as far as the limit (H0) that does not reach the irreversibly demagnetizing field region, allowing for the material characteristics of the permanent magnets 23. The voltages that arise due to the rotation of the rotor 20 can thereby be further suppressed, enabling the output from the rotary electric machine 110 to be improved. Moreover, the upper limit value of the inverter phase currents is set for each of the first inverter 305 and the second inverter 306, but in the case of two-system driving, these are set to equal values.

Next, effects due to the present Embodiment 1 will be explained in contrast to a comparative example.

Figure 10:
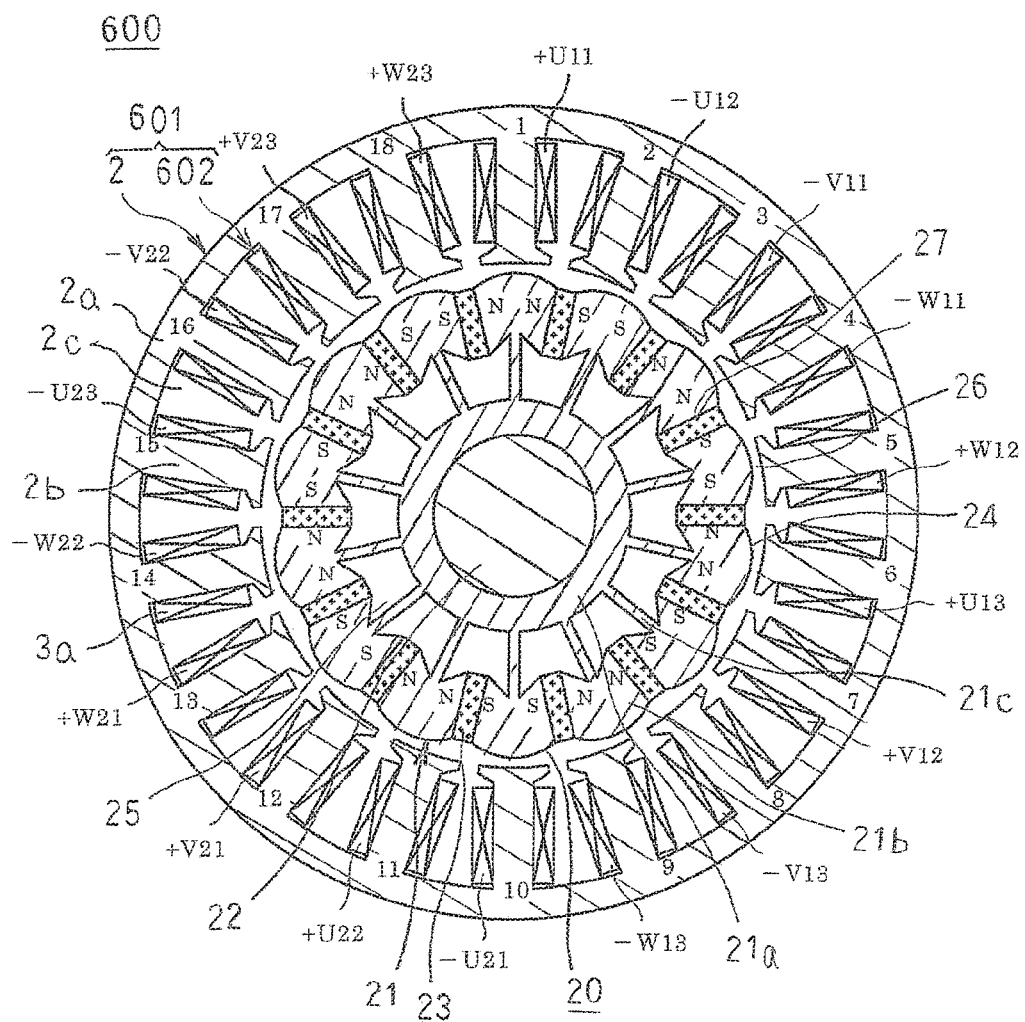
FIG. 10 is a longitudinal cross section that shows a comparative rotary electric machine.

First, a comparative rotary electric machine 600 will be explained using FIG. 10. FIG. 10 is a longitudinal cross section that shows a comparative rotary electric machine. In the comparative rotary electric machine 600, as shown in FIG. 10, a stator 601 and a rotor 20 are included. The stator 601 includes a stator core 2 and an armature winding 602. The armature winding 602 includes a first armature winding and a second armature winding that are configured by connecting eighteen coils 3a that are wound for an equal number of turns onto respective teeth 2b in a similar or identical manner to that of the armature winding 3 in Embodiment 1. As shown in FIG. 10, the eighteen coils 3a that are wound for an equal number of turns onto the respective teeth 2b line up circumferentially in order of +U11, −U12, −V11, −W11, +W12, +U13, +V12, −V13, −W13, −U21, +U22, +V21, +W21, −W22, −U23, −V22, +V23, and +W23.

In this manner, the comparative stator 601 is configured in a similar or identical manner to the stator 1 according to Embodiment 1 except that the coils 3a that are included in the first armature winding and the coils 3a that are included in the second armature winding are not disposed so as to alternate circumferentially. The comparative electric driving apparatus is configured in a similar or identical manner to the electric driving apparatus 100 according to Embodiment 1 except that the rotary electric machine 600 is used instead of the rotary electric machine 110.

Next, the comparative example and Embodiment 1 will be compared for demagnetizing fields that arise in the permanent magnets 23 when flux-weakening control is performed.

First, results that were verified during two-system driving will be explained. Since the demagnetizing fields that arise in the permanent magnets 23 when flux-weakening control is performed change depending on the phase of electric current that is passed to the armature winding and the position of the rotor 20, verification was implemented for the phase of the electric current passed and the position of the rotor 20 at which the maximum demagnetizing fields arise in the permanent magnets 23.

In the rotor 20, since the permanent magnets 23 are disposed on the rotor core 21 in a radial pattern, magnetic flux that enters each single permanent magnet 23 from an N pole side and exits at an S pole side is dominant as a factor in the demagnetizing fields. Consequently, the demagnetizing fields increase in conditions in which the amount of magnetic flux that flows in through the field core 21b on the N pole side of the rotor core 21 and flows out to the field core 21b on the S pole side is large. Specifically, the demagnetizing fields increase at the position of the coils 3a and the phase of the inverter phase currents at which the difference between the magnetomotive forces of the coils 3a that are wound onto the teeth 2b that are disposed on the N pole side and the S pole side, respectively, when viewed from the permanent magnets 23 is large.

Figure 11A:
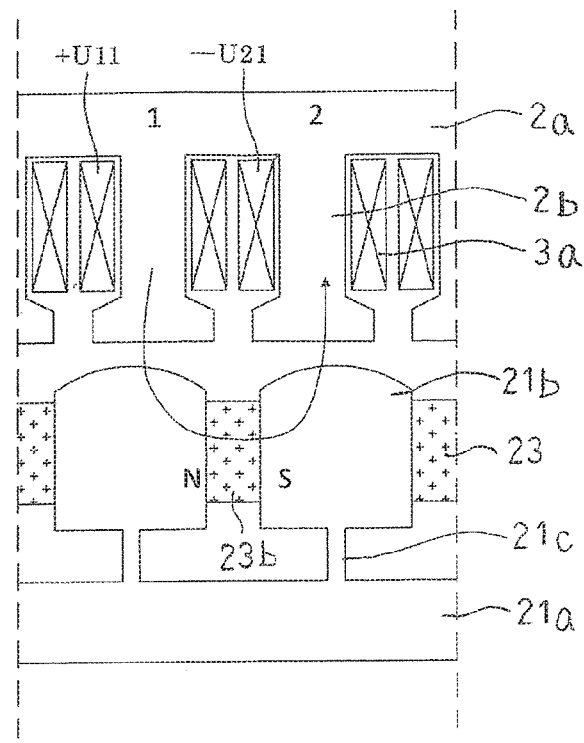
FIG. 11A is a schematic diagram that shows a state of the rotary electric machine at which demagnetizing fields are at a maximum during two-system driving in the electric driving apparatus according to Embodiment 1 of the present invention.
Figure 11B:
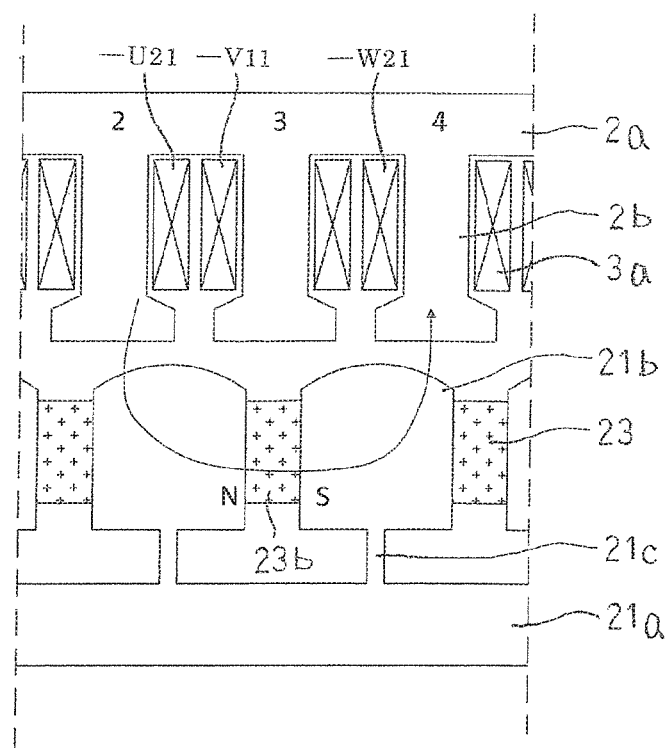
FIG. 11B is a schematic diagram that shows a state of the rotary electric machine at which demagnetizing fields are at a maximum during single-system driving in the electric driving apparatus according to Embodiment 1 of the present invention.
Figure 12:
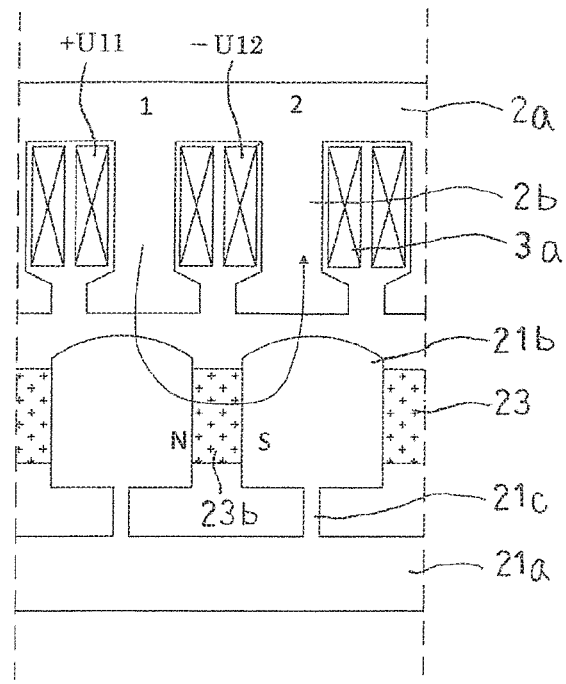
FIG. 12 is a schematic diagram that shows a state of the rotary electric machine at which demagnetizing fields are at a maximum during two-system driving in a comparative electric driving apparatus.

Examples when the demagnetizing fields are at a maximum in the 14-pole 18-tooth winding arrangement in the rotary electric machine 110 according to Embodiment 1 are shown in to FIGS. 11A and 12. FIG. 11A is a schematic diagram that shows a state of the rotary electric machine at which demagnetizing fields are at a maximum during two-system driving in the electric driving apparatus according to Embodiment 1 of the present invention, FIG. 11B is a schematic diagram that shows a state of the rotary electric machine at which demagnetizing fields are at a maximum during single-system driving in the electric driving apparatus according to Embodiment 1 of the present invention, and FIG. 12 is a schematic diagram that shows a state of the rotary electric machine at which demagnetizing fields are at a maximum during two-system driving in a comparative electric driving apparatus. Moreover, FIGS. 11A, 11B, and 12 show states in which the stator and the rotor are opened out rectilinearly. Furthermore, to facilitate explanation, in FIGS. 11A, 11B, and 12, numbering 23b is applied to the permanent magnets that interlink with the magnetic flux that arises due to the passage of electric current through the coils 3a.

Here, in FIGS. 11A and 12, the coils 3a that are wound onto the adjacent teeth 2b have identical phases and opposite winding directions. Among the U-, V-, and W-phase three-phase alternating-currents that are passed through the coils 3a, the inverter phase currents are supplied such that the U-phase current is at a maximum value.

The permanent magnets 23b are disposed approximately centrally between the adjacent teeth 2b. Here, the difference between the magnetomotive forces of the coils 3a that are wound onto the teeth 2b that are disposed on the N pole side and the S pole side of the permanent magnets 23b is large. Thus, as indicated by the arrows in FIGS. 11A and 12, the magnetic flux that enters the permanent magnet 23b from the N-pole field pole portion 21b and passes out of the permanent magnet 23b to the S-pole field pole portion 21b is at a maximum, and the demagnetizing field is also at a maximum. In such conditions, the demagnetizing fields are at a maximize in both Embodiment 1 and the comparative example, and the controlling circuit board 123 that functions as the control portion performs flux-weakening control in which the maximum value of the demagnetizing fields is increased to the limit (H0), which does not reach the irreversibly demagnetizing field region.

Next, results that have been verified during single-system driving will be explained. During single-system driving, demagnetizing fields are also maximized in the comparative winding arrangement in the arrangement between the permanent magnets 23b and the teeth 2b that is shown in FIG. 12 above. In the winding arrangement according to Embodiment 1, on the other hand, the coils 3a that are included in the first armature winding 301 and the coils 3a that are included in the second armature winding 302 are disposed so as to alternate circumferentially. Thus, electric current is not supplied to one coil 3a of the adjacent coils 3a, and magnetomotive force is not generated. Consequently, in contrast to the two-system driving that is shown in FIG. 11A above, in the single-system driving that is shown in FIG. 11B, the difference between the magnetomotive forces of the coils 3a that are wound onto the teeth 2b that are one tooth apart, that are disposed on the N pole side and the S pole side of the permanent magnets 23b is large, maximizing the demagnetizing fields. Moreover, among the U-, V-, and W-phase three-phase alternating-currents that are passed through the coils 3a, the inverter phase currents are supplied such that the U-phase current and the W-phase current are equal.

The difference in magnetomotive force between identical-phase coils 3a that are wound onto adjacent teeth 2b in a reverse winding direction and the difference in magnetomotive force between different-phase coil 3a that have equal electric current values that are wound onto teeth 2b that are separated by a single tooth in an identical winding direction will now be considered. In the passage of three-phase electric current, since the electric current is supplied so as to have a phase difference of 120 degrees between the different-phase coils 3a, the maximum value of the difference in magnetomotive force between the different-phase coils 3a that have an identical winding direction is cos (30 degrees) =(1866 times that of the maximum value of the difference in magnetomotive force between the identical-phase coils 3a in which the winding direction is reversed. In this manner, it can be seen that the difference in magnetomotive force between different-phase coils 3a that have equal electric current values that are wound onto teeth 2b that are separated by a single tooth in an identical winding direction is lower than the difference in magnetomotive force between the identical-phase coils 3a that are wound onto the adjacent teeth 2b in a reverse direction. From this, demagnetizing fields that arise in the permanent magnets 23 can be reduced in the electric driving apparatus 100 according to Embodiment 1 compared to the comparative electric driving apparatus.

Figure 13:
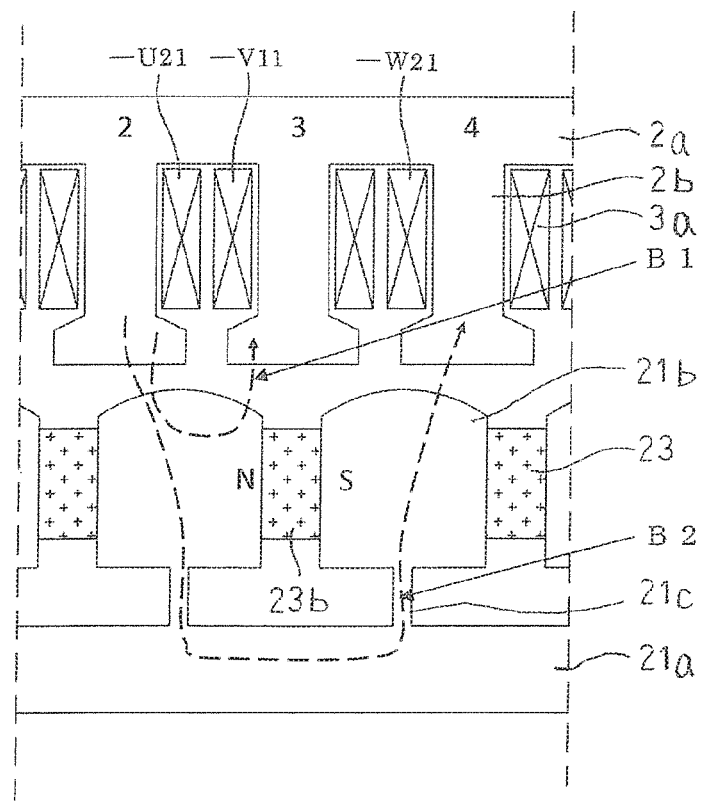
FIG. 13 is a diagram that shows magnetic leakage flux during inverter failure in the electric driving apparatus according to Embodiment 1 of the present invention.

Next, magnetic leakage flux during inverter failure in Embodiment 1 is shown in FIG. 13. FIG. 13 is a diagram that shows magnetic leakage flux during inverter failure in the electric driving apparatus according to Embodiment 1 of the present invention. Moreover, FIG. 13 shows a state in which the stator and the rotor are opened out rectilinearly. Furthermore, to facilitate explanation, in FIG. 13, numbering 23b is applied to the permanent magnets that interlink with the magnetic flux that arises due to the passage of electric current through the coils 3a.

In FIG. 13, electric current is not being supplied to the coil 3a (−V11) that is wound onto the central tooth 2b, that is, the tooth 2b at Number 3, but a portion of the magnetic flux that is inputted into the field pole portions 21b generates tooth magnetic leakage flux B1 that leaks into the tooth 2b at Number 3. Since tooth magnetic leakage flux B1 of this kind is magnetic flux that does not pass through the permanent magnets 23b, the effects of demagnetizing fields can be further reduced. Since the bridge portions 21c is formed on the rotor core 21, bridge portion magnetic leakage flux B2 that passes through the bridge portions 21c is also generated. Since bridge portion magnetic leakage flux B2 of this kind is also magnetic flux that does not pass through the permanent magnets 23b, the effects of demagnetizing fields can be further reduced. Moreover, it is not absolutely necessary for the bridge portions 21c to be integrated with the rotor core 21, and it goes without saying that similar or identical effects can be achieved if magnetic bodies that connect adjacent field pole portions 21b together are disposed so as to detour around the permanent magnets 23b.

Figure 14A:
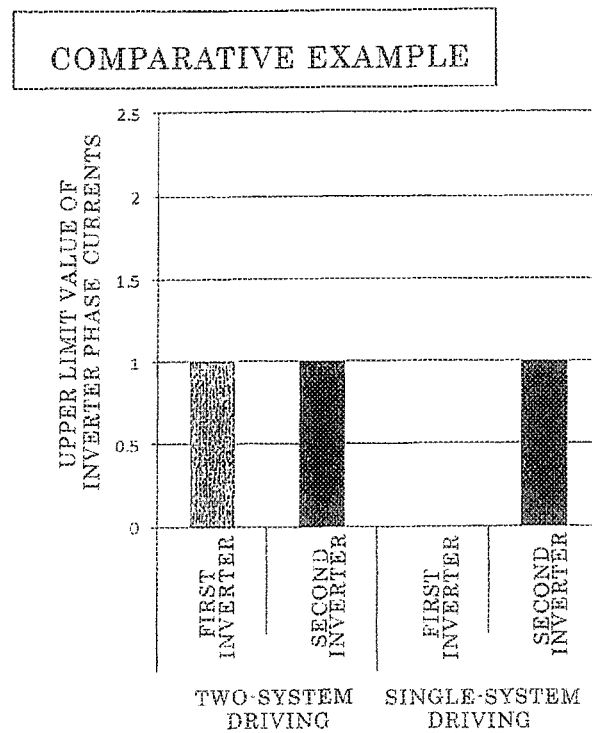
FIG. 14A is a graph that explains an upper limit value of inverter phase currents that are supplied to an armature winding in the comparative electric driving apparatus.
Figure 14B:
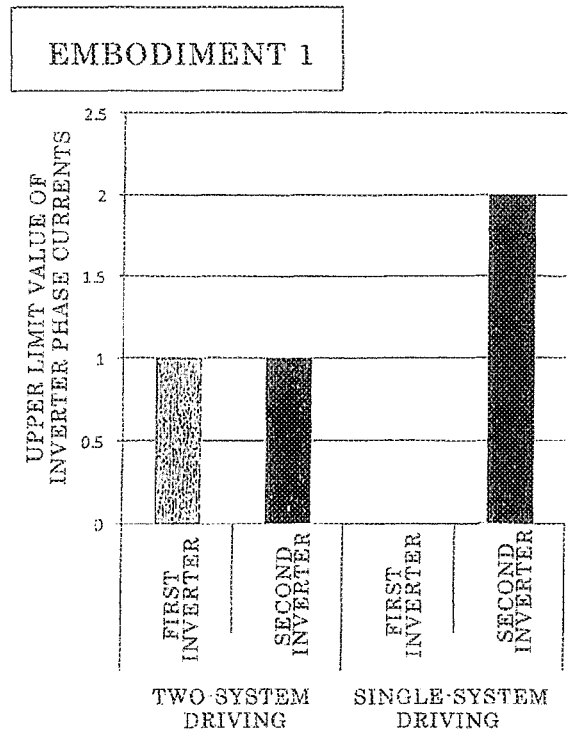
FIG. 14B is a graph that explains an upper limit value of inverter phase currents that are supplied to an armature winding in the electric driving apparatus according to Embodiment 1 of the present invention.

Next, the upper limit value on the inverter phase currents in Embodiment 1 will be explained. FIG. 14A is a graph that explains an upper limit value of inverter phase currents that are supplied to an armature winding in the comparative electric driving apparatus, and FIG. 14B is a graph that explains an upper limit value of inverter phase currents that are supplied to an armature winding in the electric driving apparatus according to Embodiment 1 of the present invention. Moreover, an upper limit value of the inverter phase currents that are supplied to the first armature winding and the second armature winding during two-system driving is 1.0. During single-system driving, driving of the first inverter 305 is stopped, and the first motor relay 146 is opened.

In the comparative example, the maximum value of the demagnetizing fields that arise in the permanent magnets 23 during single-system driving is identical to the maximum value of the demagnetizing fields that arise in the permanent magnets 23 during two-system driving. Thus, as shown in FIG. 14A, the upper limit value of the inverter phase currents that are supplied to the first armature winding and the second armature winding during two-system driving are set so as to be equal to the upper limit value of the inverter phase currents that are supplied to the first armature winding 301 and the second armature winding 302 during two-system driving, in other words, 1.0. In the comparative example, if the upper limit value of the inverter phase currents during single-system driving are set to a higher value than 1.0, the permanent magnets 23 demagnetize irreversibly.

In Embodiment 1, on the other hand, as shown in FIG. 14B, the controlling circuit board 123 is configured so as to enable the upper limit value of the inverter phase currents to be increased to 2.0 during single-system driving, achieving single-system driving in which the upper limit value of the inverter phase currents is increased. Here, the upper limit value of the inverter phase currents in single-system driving is set so as to be greater than the value of the inverter phase currents that place the demagnetizing fields on the permanent magnets 23 in the irreversibly demagnetizing field region during two-system driving. Output from the rotary electric machine 110 can be further improved by increasing the upper limit value of the inverter phase currents in this manner. Thus, even if inverter phase currents that are great are passed only to the second armature winding 302 during single-system driving, since the demagnetizing fields that act on the permanent magnets 23 are reduced as described above, irreversible demagnetization does not arise in the permanent magnets 23. Consequently, it becomes possible to increase the upper limit value of the inverter phase currents without irreversible demagnetization arising in the permanent magnets 23.

Figure 15:
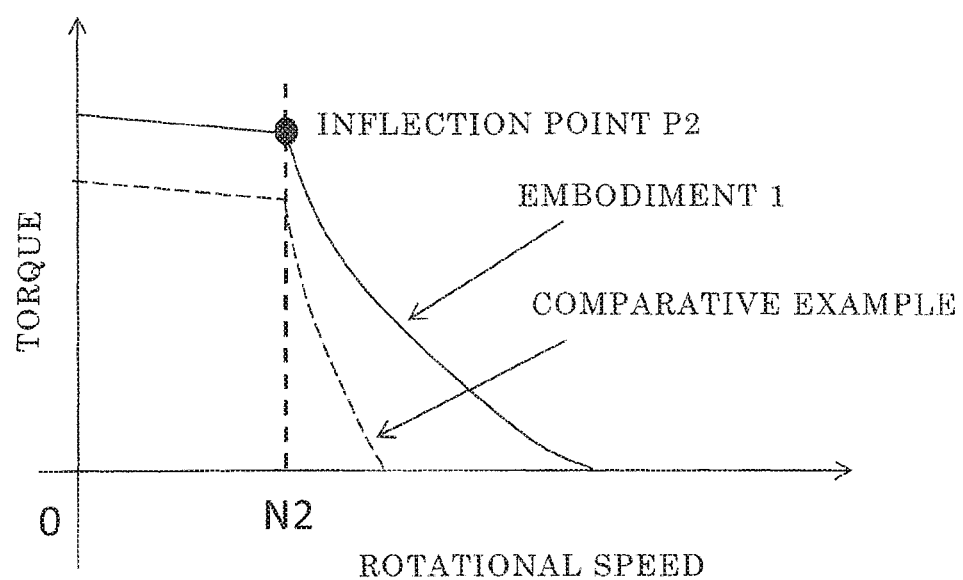
FIG. 15 is a graph that shows a relationship between rotational frequency and torque during single-system driving of the rotary electric machine of the electric driving apparatus according to Embodiment 1 of the present invention.

Now, rotary electric machine rotational frequency and torque characteristics during inverter failure are shown in FIG. 15. FIG. 15 is a graph that shows a relationship between rotational frequency and torque during single-system driving of the rotary electric machine of the electric driving apparatus according to Embodiment 1 of the present invention. Moreover, in FIG. 15, a solid line represents Embodiment 1, and a broken line represents the comparative example.

During single-system driving, since the upper limit value of the inverter phase currents that are supplied to the second armature winding 302 from the second inverter 306 can be increased in Embodiment 1 compared to the comparative example, electric current value can be increased when flux-weakening control is not implemented and when field-weakening control is implemented, increasing torque at all rotational frequencies. Consequently, it can be seen that the output from the rotary electric machine 110, which is a product of the torque and the rotational frequency, is improved. In this manner, according to Embodiment 1, even if the first inverter 305 fails, for example, declines in output due to not supplying inverter phase currents to the first armature winding 301 can be suppressed.

Moreover, it has been made possible to increase the upper limit value of the inverter phase currents during single-system driving to 2.0, but even if the upper limit value is increased further, demagnetizing fields that act on the permanent magnets 23 can be reduced during single-system driving compared to during two-system driving. In this manner, the upper limit value of the inverter phase currents can be increased relatively while suppressing the occurrence of irreversible demagnetization in the permanent magnets 23 during single-system driving compared to during two-system driving. Consequently, output from the rotary electric machine can be improved compared to single-system driving of the comparative example even if the upper limit value of the inverter phase currents during single-system driving is made greater than 2.0. It goes without saying that output from the rotary electric machine can be improved compared to single-system driving of the comparative example if the upper limit value of the inverter phase currents is greater than 1.0 and less than or equal to 2.0.

In this manner, according to Embodiment 1, since the coils 3a that constitute the first armature winding 301 and the coils 3a that constitute the second armature winding 302 are disposed so as to alternate circumferentially, if a single inverter fails, demagnetizing fields that arise in the permanent magnets 23 can be suppressed. The permanent magnets 23 can thereby be suppressed from demagnetizing irreversibly during flux-weakening control. If failure of a single system is detected, because the upper limit value of the inverter phase currents on the side that has not failed is increased relative to the upper limit value of the inverter phase currents in two-system driving in a range in which irreversible demagnetization does not arise in the permanent magnets 23 to perform single-system driving, it becomes possible to supply ample electric current to the rotary electric machine 110 in a range that does not generate irreversible demagnetization to the permanent magnets 23, enabling output from the rotary electric machine 110 to be increased.

In Embodiment 1, the upper limit value of the inverter phase currents is set so as to perform two-system driving and single-system driving in a range in which irreversible demagnetization of the permanent magnets 23 does not occur, but even if the upper limit value of the inverter phase currents is set such that irreversible demagnetization arises in a portion of the permanent magnets 23 in either single-system driving or two-system driving, demagnetizing fields that act on the permanent magnets 23 can effectively be reduced during single-system driving compared to during two-system driving. Consequently, the upper limit value of the inverter phase currents can be improved relatively while suppressing the occurrence of irreversible demagnetization of the permanent magnets 23 during single-system driving compared to during two-system driving.

Because curved surface portions 24 of the field pole portions 21b of the rotor 20, which are surfaces that face toward the stator 1, are formed so as to have a convex curved surface shape such that an air gap length between the stator 1 and the field pole portions 21b is shortest at a halfway point between adjacent permanent magnets 23, magnetic resistance that arises between the teeth 2b and the rotor 20 can be increased. The effects of demagnetizing fields can thereby be further reduced.

The curved surface portions 24 are assumed to have a shape that has mirror symmetry that has a plane that passes through a circumferential center of the field pole portions 21b as a plane of symmetry, but are not limited thereto, and effects that are similar or identical can be achieved even if the curved surface portions 24 have different shapes on two circumferential sides of the plane that passes through the circumferential center of the field pole portions 21b.

In an electric power steering apparatus to which the electric driving apparatus 100 is mounted, if one inverter fails, the inverter that has the failure is stopped, and electric power is supplied to the armature winding from the inverter that has not failed. Thus, electric current that is supplied from the inverter that has failed, and braking torque and torque pulsation that arise in the rotary electric machine 110 due to cyclic currents that pass through the inverter that has failed, can be suppressed. Because the steering wheel can thereby be prevented from becoming inoperable due to torque that is generated by the electric driving apparatus 100 being insufficient, safety of the electric power steering apparatuses can be improved. In addition, because the maximum value of the electric current during flux-weakening control during inverter failure can be improved, decline in output from the rotary electric machine 110 during inverter failure can be prevented. Consequently, the steering wheel can be prevented from becoming inoperable, enabling safety of the electric power steering apparatus to be further improved.

In electric power steering apparatuses, it is possible that demagnetizing fields may also arise in the permanent magnets 23 during driving in which flux-weakening control is not performed if the rotor 20 of the rotary electric machine 110 rotates suddenly due to actions such as the steering wheel striking an obstacle, etc. In Embodiment 1, since demagnetizing fields that occur in the permanent magnets 23 can be reduced during single-system driving, irreversible demagnetization that arises in the permanent magnets 23 can be prevented if the rotor position changes suddenly during single-system driving. Consequently, output from the electric power steering apparatus can be increased.

Embodiment 2

Figure 16:
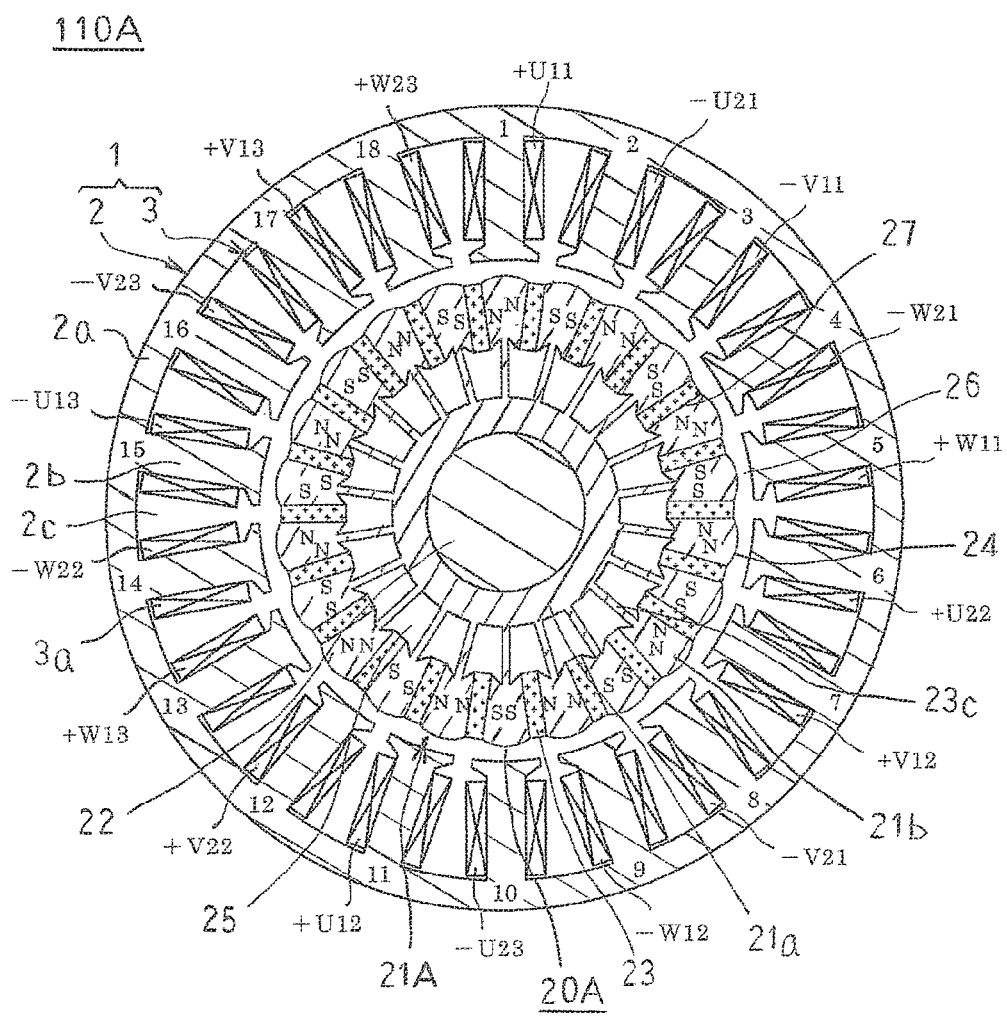
FIG. 16 is a lateral cross section that shows a rotary electric machine in an electric driving apparatus according to Embodiment 2 of the present invention.
Figure 17A:
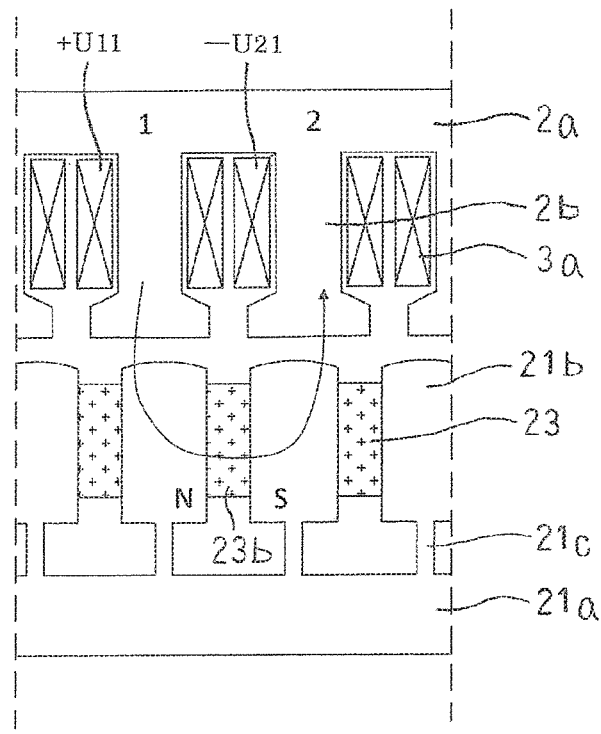
FIG. 17A is a schematic diagram that shows a state of the rotary electric machine at which demagnetizing fields are at a maximum during two-system driving in the electric driving apparatus according to Embodiment 2 of the present invention.
Figure 17B:
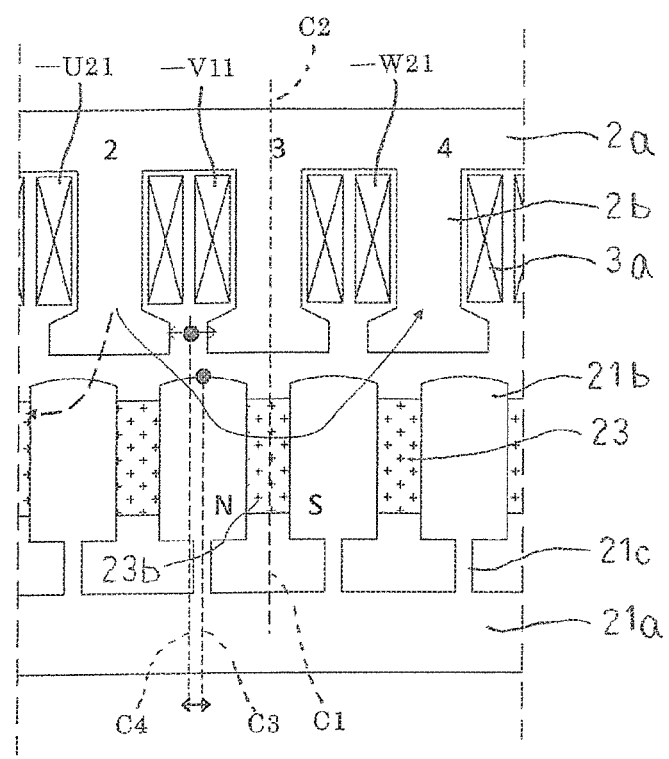
FIG. 17B is a schematic diagram that shows a state of the rotary electric machine at which demagnetizing fields are at a maximum during single-system driving in the electric driving apparatus according to Embodiment 2 of the present invention.

FIG. 16 is a lateral cross section that shows a rotary electric machine in an electric driving apparatus according to Embodiment 2 of the present invention, FIG. 17A is a schematic diagram that shows a state of the rotary electric machine at which demagnetizing fields are at a maximum during two-system driving in the electric driving apparatus according to Embodiment 2 of the present invention, and FIG. 17B is a schematic diagram that shows a state of the rotary electric machine at which demagnetizing fields are at a maximum during single-system driving in the electric driving apparatus according to Embodiment 2 of the present invention. Moreover, FIGS. 17A and 17B show states in which the stator and the rotor are opened out rectilinearly. Furthermore, to facilitate explanation, in 17A and 17B, numbering 23b is applied to the permanent magnets that interlink with the magnetic flux that arises due to the passage of electric current through the coils 3a.

In FIG. 16, a rotary electric machine 110A includes a stator 1, and a rotor 20A. The rotor 20A is configured in a similar or identical manner to the rotor 20 according to Embodiment 1 except that twenty-two permanent magnets 23 are disposed at a uniform angular pitch circumferentially, that is, the number of magnetic field poles is twenty-two. This rotary electric machine 110A is a 22-pole 18-tooth rotary electric machine, and is driven and controlled in a similar or identical manner to Embodiment 1 above by a controlling circuit board 123.

Because only the number of magnetic field poles in the rotor 20A of the rotary electric machine 110A is modified, the width that the field pole portions 21b of the rotor core 21A occupy relative to the teeth 2b is modified compared to the rotary electric machine 110.

In two-system driving, when the permanent magnets 23b are disposed approximately centrally between the adjacent teeth 2b, as shown in FIG. 17A, the difference between the magnetomotive forces of the coils 3a that are wound onto the teeth 2b that are disposed on the N pole side and the S pole side of the permanent magnets 23b is large. Thus, as indicated by the arrows in FIG. 17A, the magnetic flux that enters the permanent magnet 23b from the field pole portion 21b on the N pole side and passes out of the permanent magnet 23b to the S-pole field pole portion 21b is at a maximum, and the demagnetizing field is also at a maximum.

In single-system driving, when a center line C1 of the permanent magnets 23b is aligned with a center line C2 of the tooth 2b at Number 3, for example, as shown in FIG. 17B, the difference between the magnetomotive forces of the coils 3a that are wound onto the teeth 2b at Number 2 and Number 4, which are one tooth apart, are greatest, and demagnetizing fields are maximized. Here, a center line C3 of the field pole portion 21b that is positioned between the teeth 2b at Number 2 and Number 3 is disposed nearer to the center line C2 of the tooth 2b at Number 3 than to a center line C4 of the slot 2c. Moreover, the center line C1 of the permanent magnets 23b is a line that passes through a circumferential center of the permanent magnets 23b and the axial center of the rotating shaft 22. The center lines C2, C3, and C4 of the teeth 2b, the field pole portions 21b, and the slots 2c are also defined similarly.

During single-system driving, as indicated by the solid arrow in FIG. 17B, the magnetic flux that arises from the tooth 2b at Number 2 enters the N-pole field pole portion 21b that is positioned near the tooth 2b at Number 3, passes through a permanent magnet 23b, enters the S-pole field pole portion 21b, and flows into the tooth 2b at Number 4. As indicated by the broken arrow in FIG. 17B, a portion of the magnetic flux that arises from the tooth 2b at Number 2 generates field pole portion magnetic leakage flux that flows through the S-pole field pole portion 21b that is positioned near the tooth 2b at Number 2. Because of that, the magnetic flux that interlinks the permanent magnets 23b is reduced, reducing demagnetizing fields. Here, the condition by in which the center line C3 of the field pole portion 21b is disposed nearer to the center line C2 of the central tooth 2b than to a center line C4 of a slot 2c is P/N≥1.0. Moreover, P is the number of magnetic field poles, and N is the number of teeth.

Moreover, In Embodiment 1 above, a rotary electric machine is used in which the number of magnetic field poles is fourteen and the number of teeth is eighteen, and in Embodiment 2 above, a rotary electric machine is used in which the number of magnetic field poles is twenty-two and the number of teeth is eighteen, but it goes without saying that similar or identical effects can be achieved if a rotary electric machine is used in which the rotational symmetry number in the circumferential direction is increased, in other words, the number of magnetic field poles is (18±4)n and the number of teeth is 18n, where n is a positive integer. In Embodiments 1 and 2 above, the first armature winding and the second armature winding are three-phase connected windings, but it goes without saying that effects that are similar or identical can be achieved even if the first armature winding and the second armature winding are windings in which more than three phases, such as five phases, seven phase, nine phases, etc., are connected.

Embodiment 3

Figure 18:
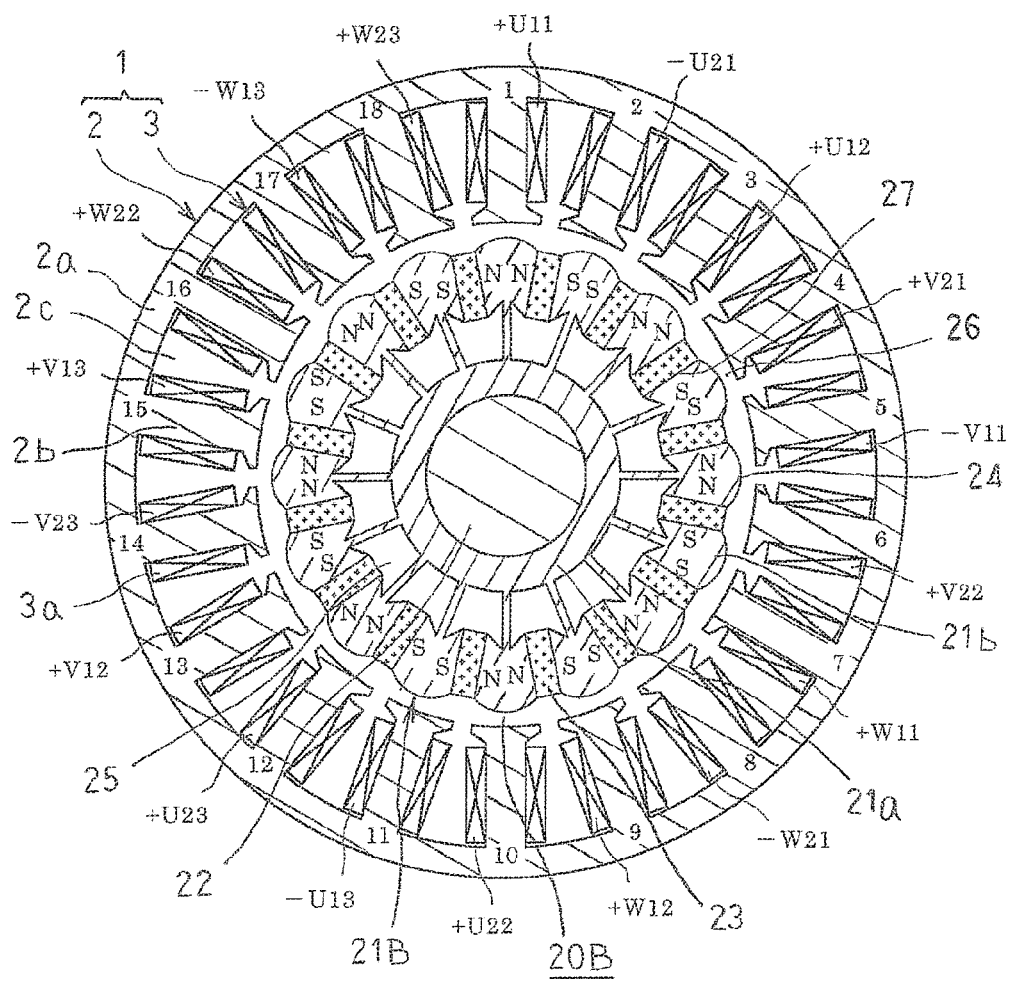
FIG. 18 is a lateral cross section that shows a rotary electric machine in an electric driving apparatus according to Embodiment 3 of the present invention.
Figure 19A:
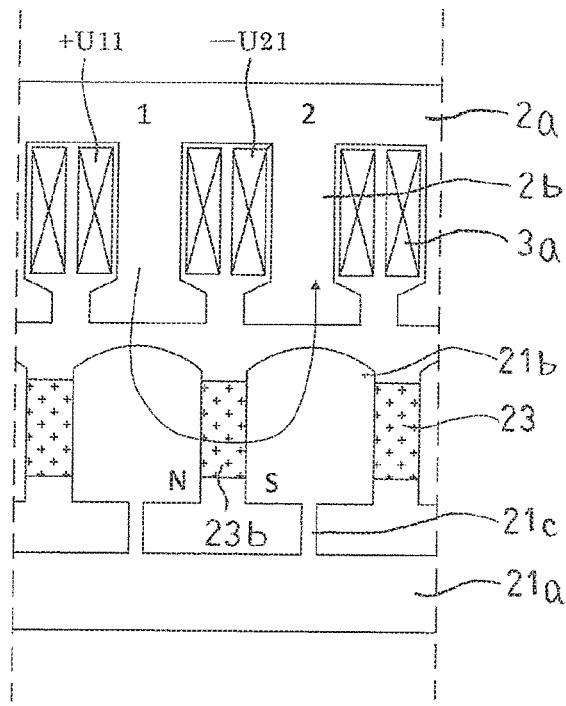
FIG. 19A is a schematic diagram that shows a state of the rotary electric machine at which demagnetizing fields are at a maximum during two-system driving in the electric driving apparatus according to Embodiment 3 of the present invention.
Figure 19B:
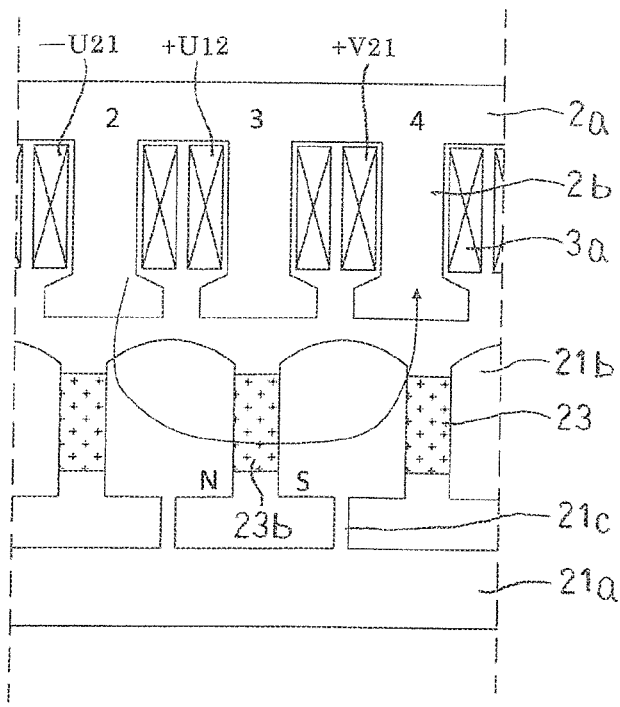
FIG. 19B is a schematic diagram that shows a state of the rotary electric machine at which demagnetizing fields are at a maximum during single-system driving in the electric driving apparatus according to Embodiment 3 of the present invention.

FIG. 18 is a lateral cross section that shows a rotary electric machine in an electric driving apparatus according to Embodiment 3 of the present invention, FIG. 19A is a schematic diagram that shows a state of the rotary electric machine at which demagnetizing fields are at a maximum during two-system driving in the electric driving apparatus according to Embodiment 3 of the present invention, and FIG. 19B is a schematic diagram that shows a state of the rotary electric machine at which demagnetizing fields are at a maximum during single-system driving in the electric driving apparatus according to Embodiment 3 of the present invention. Moreover, FIGS. 19A and 19B show states in which the stator and the rotor are opened out rectilinearly. Furthermore, to facilitate explanation, in 19A and 19B, numbering 23b is applied to the permanent magnets that interlink with the magnetic flux that arises due to the passage of electric current through the coils 3a.

In FIG. 18, a rotary electric machine 110B includes: a stator 1; and a rotor 20B that has a rotor core 21B in which sixteen field pole portions 21b are arranged at a uniform angular pitch circumferentially. The rotor 20B is configured in a similar or identical manner to the rotor 20 according to Embodiment 1 except that sixteen permanent magnets 23 are disposed at a uniform angular pitch circumferentially, that is, the number of magnetic field poles is sixteen. This rotary electric machine 110B is a 16-pole 18-tooth rotary electric machine, and is driven and controlled in a similar or identical manner to Embodiment 1 above by a controlling circuit board 123.

The U phase is constituted by six coils 3a, i.e., +U11, −U21, +U12, +U22, −U13, and +U23, the V phase is constituted by six coils 3a, i.e., +V21, −V11, +V22, +V12, −V23, and +V13, and the W phase is constituted by six coils 3a, i.e., +W11, −W21, +W12, +W22, −W13, and +W23. As shown in FIG. 18, the eighteen coils 3a line up sequentially in order of +U11, −U21, +U12, +V21, −V11, +V22, +W11, −W21, +W12, +U22, −U13, +U23, +V12, −V23, +V13, +W22, −W13, and +W23 so as to correspond to each of the teeth 2b that have numbering 1 through 18. Moreover, "+" and "−" indicate winding polarities of the coils 3a, the "+" winding polarity being opposite to the "−" winding polarity. The number of turns in all of the coils 3a is identical.

+U11, +U12, and −U13 are connected in series to constitute a U1 phase which is a first U-phase winding. −U21, +U22, and +U23 are connected in series to constitute a U2 phase which is a second U-phase winding. −V11, +V12, and +V13 are connected in series to constitute a V1 phase which is a first V-phase winding. +V21, +V22, and −V23 are connected in series to constitute a V2 phase which is a second V-phase winding. +W11, +W12, and −W13 are connected in series to constitute a phase which is a first W-phase winding. −W21, +W22, and +W23 are connected in series to constitute a W2 phase which is a second W-phase winding.

In a first connecting method, a first armature winding is formed by wye-connecting the U1 phase, the V1 phase, and the W1 phase. A second armature winding is similarly formed by wye-connecting the U2 phase, the V2 phase, and the W2 phase.

In a second connecting method, a first armature winding is formed by delta-connecting the U1 phase, the V1 phase, and the W1 phase. A second armature winding is similarly formed by delta-connecting the U2 phase, the V2 phase, and the W2 phase.

In Embodiment 3, the first armature winding and the second armature winding are also not electrically connected to each other. The coils 3a that constitute the first armature winding and the coils 3a that constitute the second armature winding are disposed so as to alternate circumferentially.

In two-system driving, when the permanent magnets 23b are disposed approximately centrally between the adjacent teeth 2b, as shown in FIG. 19A, the difference between the magnetomotive forces of the coils 3a that are wound onto the teeth 2b that are disposed on the N pole side and the S pole side of the permanent magnets 23b is large. Thus, as indicated by the arrows in FIG. 19A, the magnetic flux that enters the permanent magnet 23b from the field pole portion 21b on the N pole side and passes out of the permanent magnet 23b to the S-pole field pole portion 21b is at a maximum, and the demagnetizing field is also at a maximum. In this manner, in Embodiment 2, demagnetizing fields are also maximized in a similar or identical manner to Embodiment 1 above, when identical-phase coils 3a are wound onto adjacent teeth 2b in a reverse direction.

In single-system driving, as shown in FIG. 19B, the difference between the magnetomotive forces of the coils 3a that are wound onto the teeth 2b that are one tooth apart, that are disposed on the N pole side and the S pole side of the permanent magnets 23b is large, maximizing the demagnetizing fields. Moreover, among the U-, V-, and W-phase three-phase alternating-currents that are passed through the coils 3a, the inverter phase currents are supplied such that the U-phase current and the V-phase current are equal.

Here, the maximum value of the difference in magnetomotive force between the different-phase coils 3a that are wound onto teeth 2b that are separated by a single tooth in an opposite winding direction that have equal current value is cos(60 degrees)=0.5 times that of the maximum value of the difference in magnetomotive force between the identical-phase coils 3a that are wound onto adjacent teeth 2b in an opposite winding direction. In this manner, it can be seen that the difference in magnetomotive force between different-phase coils 3a that have equal electric current values that are wound onto teeth 2b that are separated by a single tooth in an opposite winding direction is lower than the difference in magnetomotive force between the identical-phase coils 3a that are wound onto the adjacent teeth 2b in a reverse direction. From this, demagnetizing fields can be reduced in the electric driving apparatus 100 according to Embodiment 3 compared to the electric driving apparatus compared to the electric driving apparatus according to Embodiment 1 onto which an (18±4)n-pole 18n-tooth rotary electric machine is mounted.

In Embodiment 3, since tooth magnetic leakage flux that leaks into the central tooth 2b and bridge portion magnetic leakage flux 132 that passes through the bridge portions 21c is also generated in a similar or identical manner to Embodiment 1 above, the effects of demagnetizing fields can be further reduced.

Embodiment 4

Figure 20:
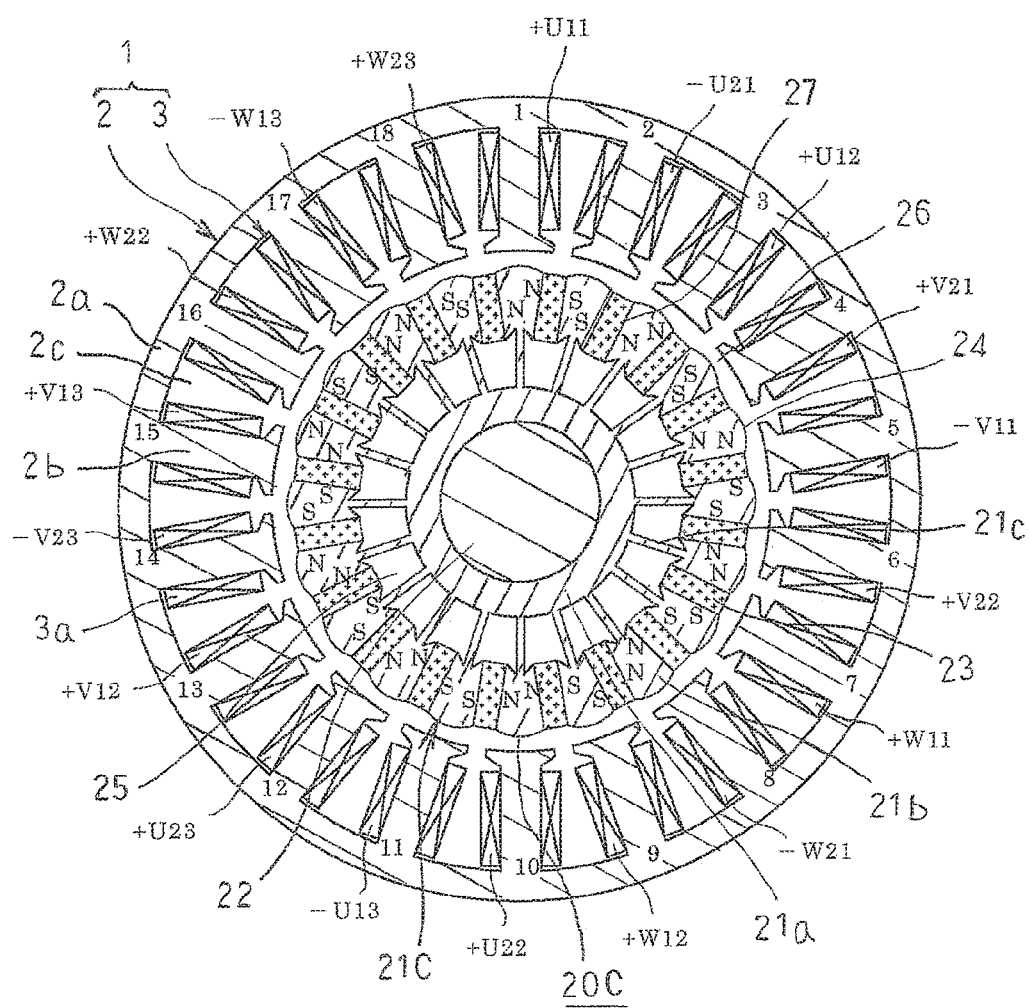
FIG. 20 is a lateral cross section that shows a rotary electric machine in an electric driving apparatus according to Embodiment 4 of the present invention.

FIG. 20 is a lateral cross section that shows a rotary electric machine in an electric driving apparatus according to Embodiment 4 of the present invention.

In FIG. 20, a rotary electric machine 1100 includes: a stator 1; and a rotor 20C that has a rotor core 21C in which twenty field pole portions 21b are arranged at a uniform angular pitch circumferentially. The rotor 20C is configured in a similar or identical manner to the rotor 20B according to Embodiment 3 except that twenty permanent magnets 23 are disposed at a uniform angular pitch circumferentially, that is, the number of magnetic field poles is twenty. This rotary electric machine 1100 is a 20-pole 18-tooth rotary electric machine, and is driven and controlled in a similar or identical manner to Embodiment 3 above by a controlling circuit board 123.

In the rotary electric machine 110C, because a relationship in which the number of magnetic field poles P is greater than the number of teeth in other words, P/N≥1.0, demagnetizing fields that arise in the permanent magnets 23 can be reduced further than in Embodiment 3 above.

Moreover, in Embodiment above, a rotary electric machine is used in which the number of magnetic field poles is sixteen and the number of teeth is eighteen, and in Embodiment 4 above, a rotary electric machine is used in which the number of magnetic field poles is twenty and the number of teeth is eighteen, but it goes without saying that similar or identical effects can be achieved if a rotary electric machine is used in which the rotational symmetry number in the circumferential direction is increased, in other words, the number of magnetic field poles is (18±2)n and the number of teeth is 18n, where n is a positive integer. In Embodiments 3 and 4 above, the first armature winding and the second armature winding are three-phase connected windings, but it goes without saying that effects that are similar or identical can be achieved even if the first armature winding and the second armature winding are windings in which more than three phases, such as five phases, seven phase, nine phases, etc., are connected.

Embodiment 5

Figure 21:
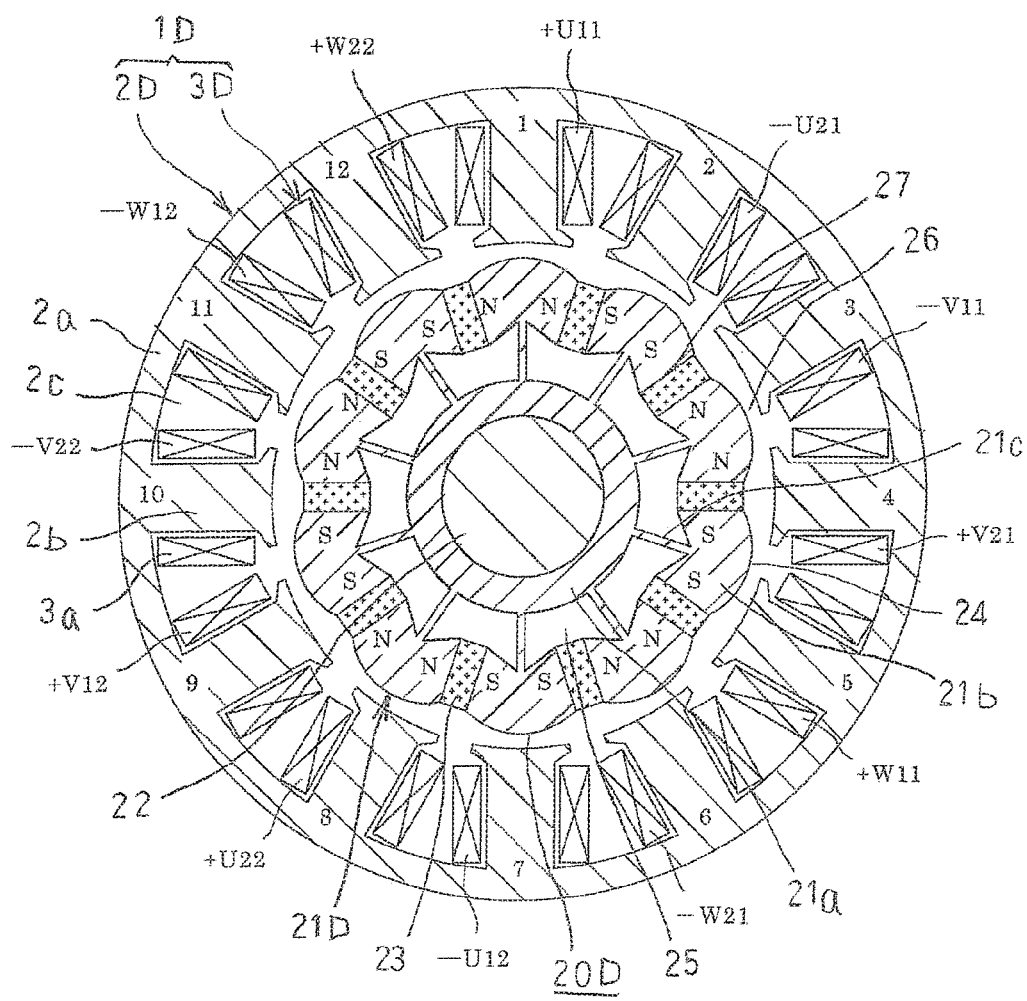
FIG. 21 is a lateral cross section that shows a rotary electric machine of an electric driving apparatus according to Embodiment 5 of the present invention.
Figure 22:
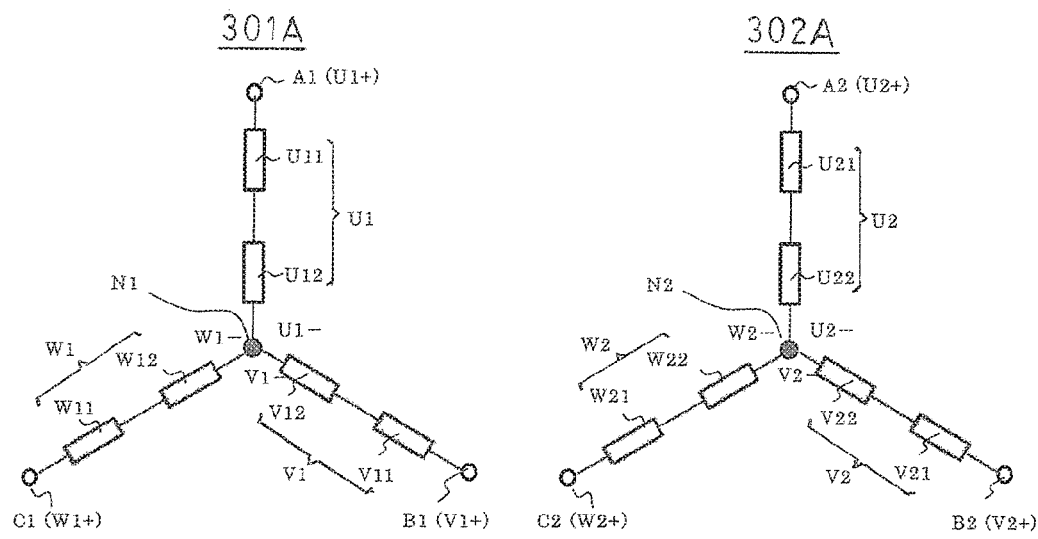
FIG. 22 is a schematic diagram that explains a first connecting method for an armature winding in the rotary electric machine according to Embodiment 5 of the present invention.
Figure 23:
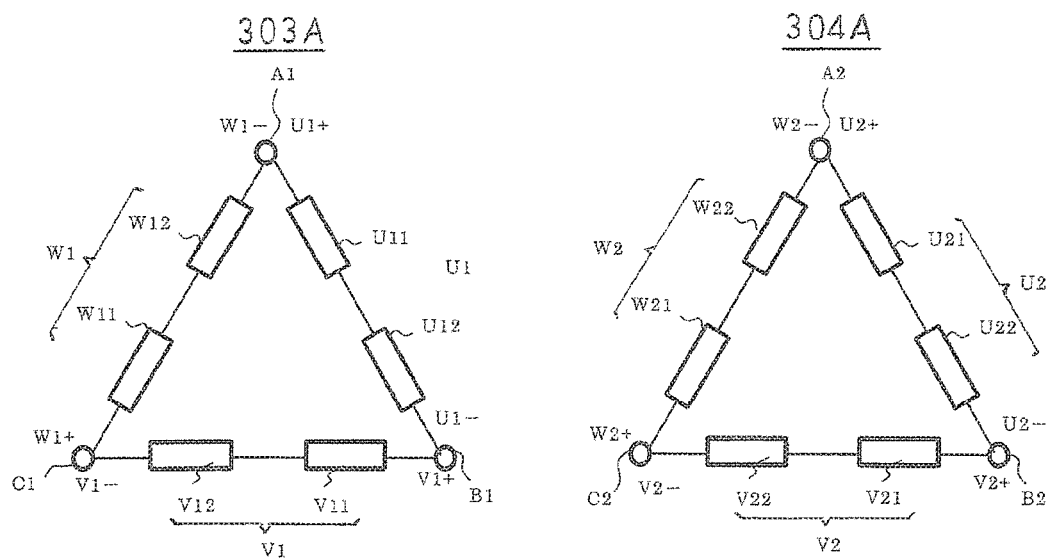
FIG. 23 is a schematic diagram that explains a second connecting method for an armature winding in the rotary electric machine according to Embodiment 5 of the present invention.
Figure 24A:
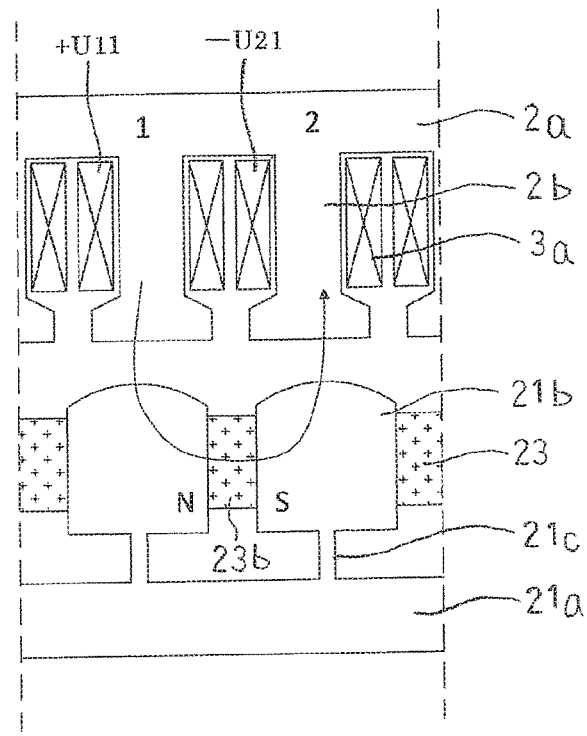
FIG. 24A is a schematic diagram that shows a state of the rotary electric machine at which demagnetizing fields are at a maximum during two-system driving in the electric driving apparatus according to Embodiment 5 of the present invention.
Figure 24B:
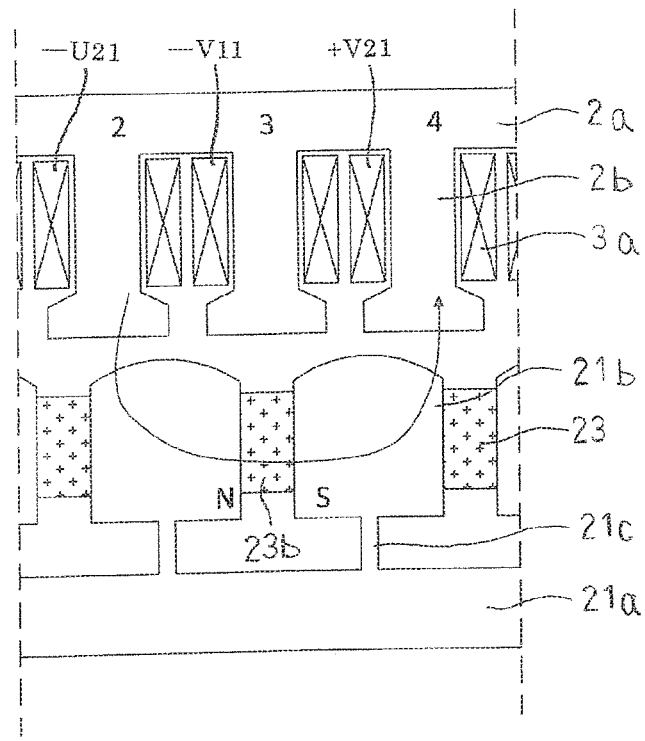
FIG. 24B is a schematic diagram that shows a state of the rotary electric machine at which demagnetizing fields are at a maximum during single-system driving in the electric driving apparatus according to Embodiment 5 of the present invention.

FIG. 21 is a lateral cross section that shows a rotary electric machine of an electric driving apparatus according to Embodiment 5 of the present invention, FIG. 22 is a schematic diagram that explains a first connecting method for an armature winding in the rotary electric machine according to Embodiment 5 of the present invention, FIG. 23 is a schematic diagram that explains a second connecting method for an armature winding in the rotary electric machine according to Embodiment 5 of the present invention, FIG. 24A is a schematic diagram that shows a state of the rotary electric machine at which demagnetizing fields are at a maximum during two-system driving in the electric driving apparatus according to Embodiment 5 of the present invention, and FIG. 24B is a schematic diagram that shows a state of the rotary electric machine at which demagnetizing fields are at a maximum during single-system driving in the electric driving apparatus according to Embodiment 5 of the present invention. Moreover, FIGS. 24A and 24B show states in which the stator and the rotor are opened out rectilinearly. Furthermore, to facilitate explanation, in 24A and 24B, numbering 23b is applied to the permanent magnets that interlink with the magnetic flux that arises due to the passage of electric current through the coils 3a.

In FIG. 21, a rotary electric machine 110D includes a stator 1D, and a rotor 20D.

The rotor 20D has: a rotor core 21D; a rotating shaft 22 that is inserted into and fixed to a central position of the rotor core 21D; and permanent magnets 23 that are fixed to the rotor core 21D. The rotor core 21D includes: an annular portion 21a into which the rotating shaft 22 is inserted and fixed; ten field pole portions 21b that are arranged at a uniform angular pitch circumferentially around an outer circumference of the annular portion 21a; and bridge portions 21c that mechanically link each of the field pole portions 21b and the annular portion 21a. Permanent magnets 23 are fixed in magnet-embedding portions 27 that are formed between each adjacent pair of field pole portions 21b. The rotor 20D that is configured in this manner has ten field poles.

The stator 1D includes: a stator core 2D in which twelve teeth 2b are disposed at a uniform angular pitch circumferentially so as to each protrude radially inward from an inner circumferential surface of the annular core back 2a; and an armature winding 3D that includes twelve coils 3a that are wound onto each of the teeth 2b. The stator 1D has twelve teeth 2b.

The U phase is constituted by four coils 3a, i.e., +U11, −U21, −U12, and +U22, the V phase is constituted by four coils 3a, i.e., −V11, +V21, +V12, and −V22, and the W phase is constituted by four coils 3a, i.e., +W11, −W21, −W12, and +W22. As shown in FIG. 21, the twelve coils 3a line up sequentially in order of +U11, −U21, −V11, +V21, +W11, −W21, −U12, +U22, +V12, −V22, −W12, and +W22 so as to correspond to each of the teeth 2b that have numbering 1 through 12. Moreover, "+" and "−" indicate winding polarities of the coils 3a, the "+" winding polarity being opposite to the "−" winding polarity. The number of turns in all of the coils 3a is identical.

+U11 and −U12 are connected in series to constitute a U1 phase which is a first U-phase winding. −U21 and +U22 are connected in series to constitute a U2 phase which is a second U-phase winding. −V11 and +V12 are connected in series to constitute a V1 phase which is a first V-phase winding. +V21 and −V22 are connected in series to constitute a V2 phase which is a second V-phase winding. +W11 and −W12 are connected in series to constitute a W1 phase which is a first W-phase winding. −W21 and +W22 are connected in series to constitute a W2 phase which is a second W-phase winding.

A U11 end portion of the U1 phase is U1+, and a U12 end portion is U1−, and similarly a U21 end portion of the U2 phase is U2+, and a U22 end portion is U2−. A V11 end portion of the V1 phase is V1+, and a V12 end portion is V1−, and similarly a V21 end portion of the V2 phase is V2+, and a V22 end portion is V2−. A W11 end portion of the W1 phase is W1+, and a W12 end portion is W1−, and a W21 end portion of the U2 phase is W2+, and a W22 end portion is W2−.

In a first connecting method, as shown in FIG. 22, U1−, V1−, and W1− are electrically connected to configure a first armature winding 301A that is formed by wye-connecting the U1 phase, the V1 phase, and the W1 phase. The connected portion at U1−, V1−, and W1− becomes a neutral point N1 of the first armature winding 301A, and U1+, V1+, and W1+ become output terminals A1, B1, and C1 of the first armature winding 301A. U2−, V2−, and W2− are similarly electrically connected to configure a second armature winding 302A that is formed by wye-connecting the U2 phase, the V2 phase, and the W2 phase. The connected portion at U2−, V2−, and W2− becomes a neutral point N2 of the second armature winding 302A, and U2+, V2+, and W2+ become output terminals A2, B2, and C2 of the second armature winding 302A. In this manner, the armature winding 3D is constituted by the first armature winding 301A and the second armature winding 302A. Moreover, the first armature winding 301A and the second armature winding 302A are not electrically connected.

In a second connecting method, as shown in FIG. 23, U1− and W1− are electrically connected, U1− and V1+ are electrically connected, and V1− and W1+ are electrically connected to configure a first armature winding 303A that is formed by delta-connecting the U1 phase, the V1 phase, and the W1 phase. The connected portion at U1− and W1−, the connected portion at U1− and V1+, and the connected portion at V1− and W1+ become output terminals A1, B1, and C1 of the first armature winding 303A. Similarly, U2+ and W2− are electrically connected, U2− and V2+ are electrically connected, and V2− and W2+ are electrically connected to configure a second armature winding 304A that is formed by delta-connecting the U2 phase, the V2 phase, and the W2 phase. The connected portion at U2+ and W2−, the connected portion at U2− and V2+, and the connected portion at V2− and W2+ become output terminals A2, B2, and C2 of the second armature winding 304A. In this manner, the armature winding 3D is constituted by the first armature winding 303A and the second armature winding 304A. Moreover, the first armature winding 303A and the second armature winding 304A are not electrically connected.

In Embodiment 5, the first armature winding 301A or 303A and the second armature winding 302A or 304A are also not electrically connected to each other. The coils 3a that constitute the first armature winding 301A or 303A and the coils 3a that constitute the second armature winding 302A or 304A are disposed so as to alternate circumferentially.

In two-system driving, when the permanent magnets 23b are disposed approximately centrally between the adjacent teeth 2b, as shown in FIG. 24A, the difference between the magnetomotive forces of the coils 3a that are wound onto the teeth 2b that are disposed on the N pole side and the S pole side of the permanent magnets 23b is large. Thus, as indicated by the arrows in FIG. 24A, the magnetic flux that enters the permanent magnet 23b from the N-pole field pole portion 21b and passes out of the permanent magnet 23b to the S-pole field pole portion 21b is at a maximum, and the demagnetizing field is also at a maximum. In this manner, in Embodiment 5, demagnetizing fields are also maximized in a similar or identical manner to Embodiment 1 above, when identical-phase coils 3a are wound onto adjacent teeth 2b in a reverse direction.

In single-system driving, as shown in FIG. 24B, the difference between the magnetomotive forces of the coils 3a that are wound onto the teeth 2b that are one tooth apart, that are disposed on the N pole side and the S pole side of the permanent magnets 23b is large, maximizing the demagnetizing fields. Moreover, among the U-, V-, and W-phase three-phase alternating-currents that are passed through the coils 3a, the inverter phase currents are supplied such that the U-phase current and the V-phase current are equal.

Here, the maximum value of the difference in magnetomotive force between the different-phase coils 3a that are wound onto teeth 2b that are separated by a single tooth in an opposite winding direction that have equal current value is cos(60 degrees)=0.5 times that of the maximum value of the difference in magnetomotive force between the identical-phase coils 3a that are wound onto adjacent teeth 2b in an opposite winding direction. In this manner, it can be seen that the difference in magnetomotive force between different-phase coils 3a that have equal electric current values that are wound onto teeth 2b that are separated by a single tooth in an opposite winding direction is lower than the difference in magnetomotive force between the identical-phase coils 3a that are wound onto the adjacent teeth 2b in a reverse direction. From this, demagnetizing fields can be reduced in the electric driving apparatus 100 according to Embodiment 5 compared to the electric driving apparatus compared to the electric driving apparatus according to Embodiment 1 onto which an (18±4)n-pole 18n-tooth rotary electric machine is mounted.

In Embodiment 5, since tooth magnetic leakage flux that leaks into the central tooth 2b and bridge portion magnetic leakage flux B2 that passes through the bridge portions 21c is also generated in a similar or identical manner to Embodiment 1 above, the effects of demagnetizing fields can be further reduced.

Embodiment 6

Figure 25:
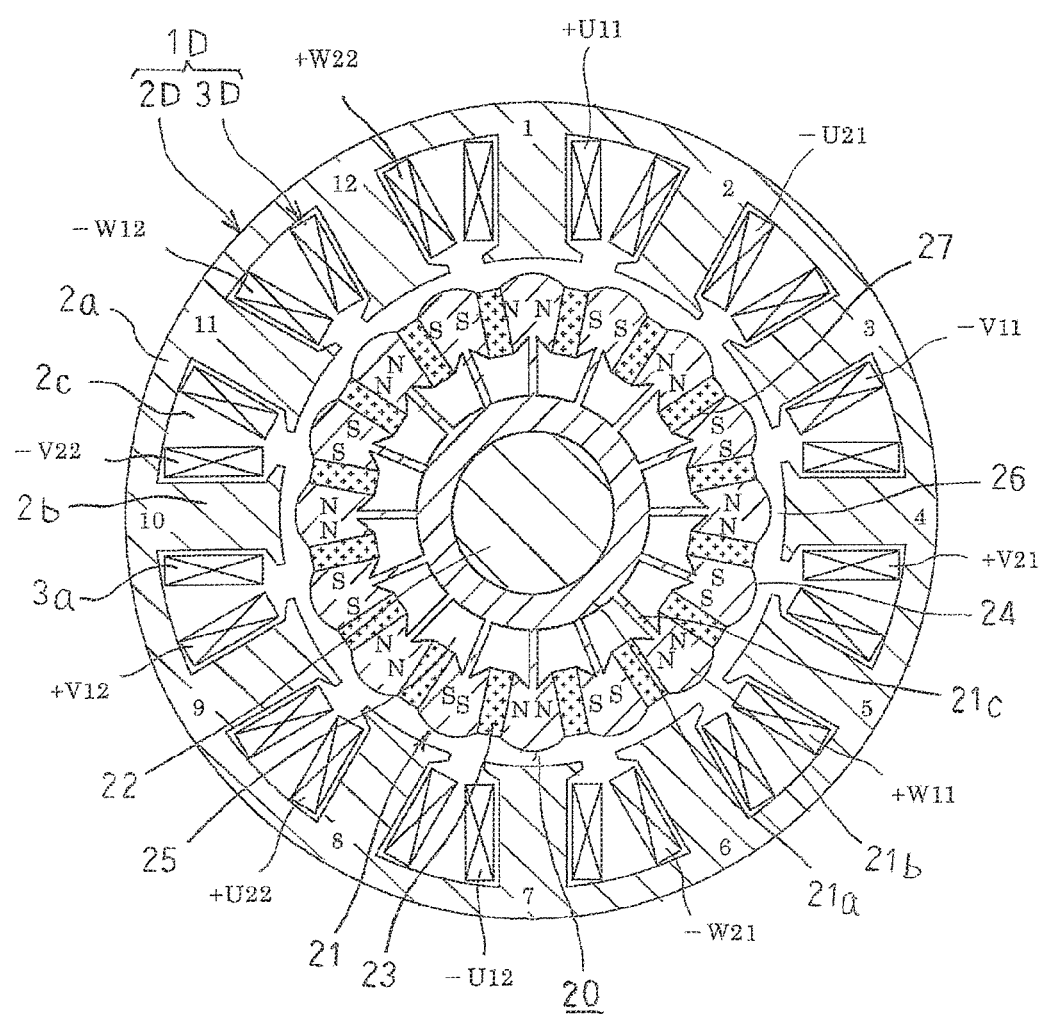
FIG. 25 is a lateral cross section that shows a rotary electric machine in an electric driving apparatus according to Embodiment 6 of the present invention.

FIG. 25 is a lateral cross section that shows a rotary electric machine in an electric driving apparatus according to Embodiment 6 of the present invention.

In FIG. 25, a rotary electric machine 110E includes a stator 1D, and a rotor 20. The rotor 20 is configured in a similar or identical manner to the rotor 20D according to Embodiment 5 except that fourteen permanent magnets 23 are disposed at a uniform angular pitch circumferentially, that is, the number of magnetic field poles is fourteen. This rotary electric machine 110E is a 14-pole 12-tooth rotary electric machine, and is driven and controlled in a similar or identical manner to Embodiment 5 above by a controlling circuit board 123.

In the rotary electric machine 110E, because a relationship in which the number of magnetic field poles P is greater than the number of teeth N, in other words, P/N≥1.0, demagnetizing fields that arise in the permanent magnets 23 can be reduced further than in Embodiment 5 above.

Moreover, in Embodiment 5 above, a rotary electric machine is used in which the number of magnetic field poles is ten and the number of teeth is twelve, and in Embodiment 6 above, a rotary electric machine is used in which the number of magnetic field poles is fourteen and the number of teeth is twelve, but it goes without saying that similar or identical effects can be achieved if a rotary electric machine is used in which the rotational symmetry number in the circumferential direction is increased, in other words, the number of magnetic field poles is (12±2)n and the number of teeth is 12n, where n is a positive integer. In Embodiments 5 and 6 above, the first armature winding and the second armature winding are three-phase connected windings, but it goes without saying that effects that are similar or identical can be achieved even if the first armature winding and the second armature winding are windings in which more than three phases, such as five phases, seven phase, nine phases, etc., are connected.

Embodiment 7

Figure 26:
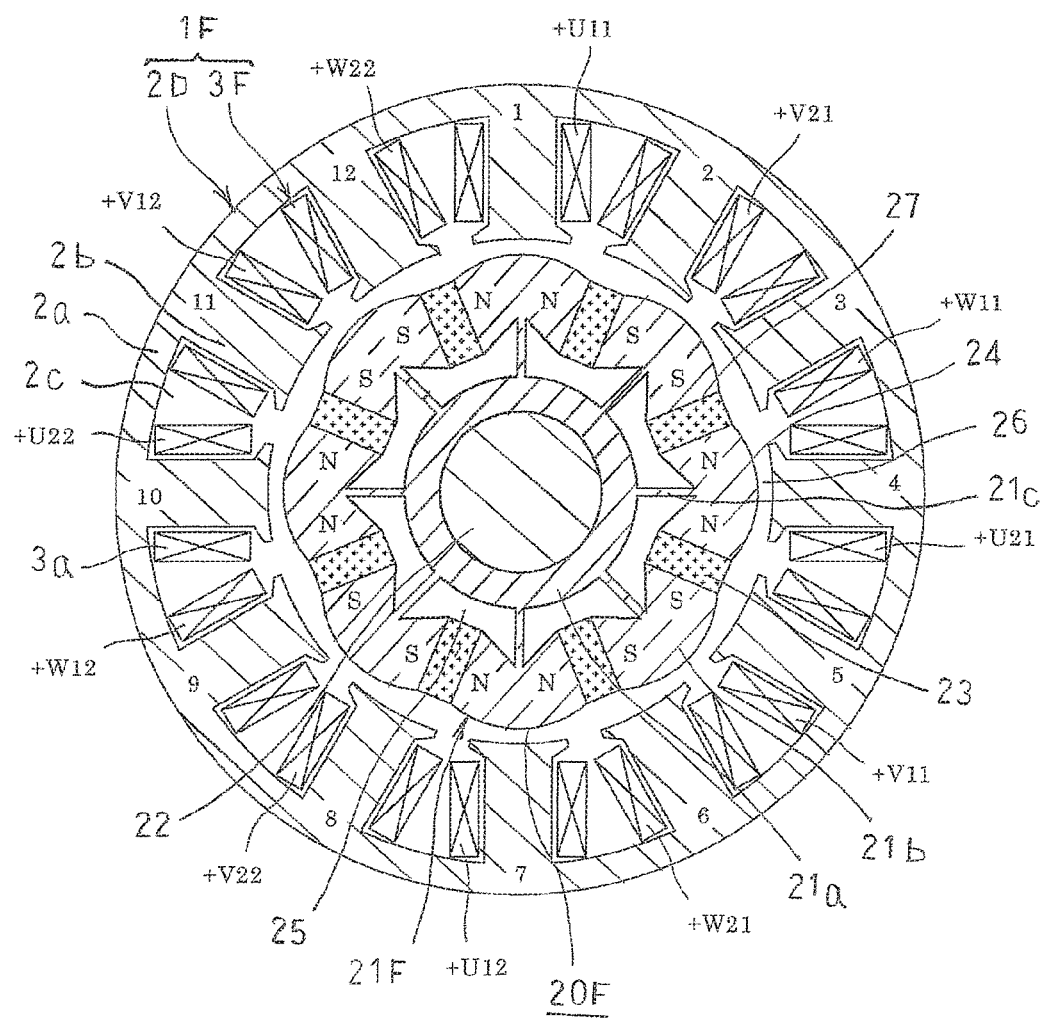
FIG. 26 is a lateral cross section that shows a rotary electric machine in an electric driving apparatus according to Embodiment 7 of the present invention.
Figure 27A:
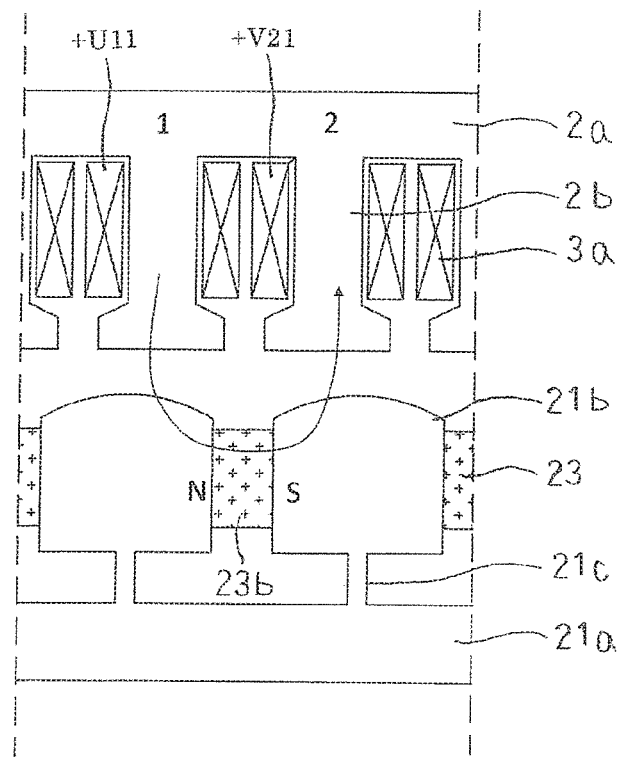
FIG. 27A is a schematic diagram that shows a state of the rotary electric machine at which demagnetizing fields are at a maximum during two-system driving in the electric driving apparatus according to Embodiment 7 of the present invention.
Figure 27B:
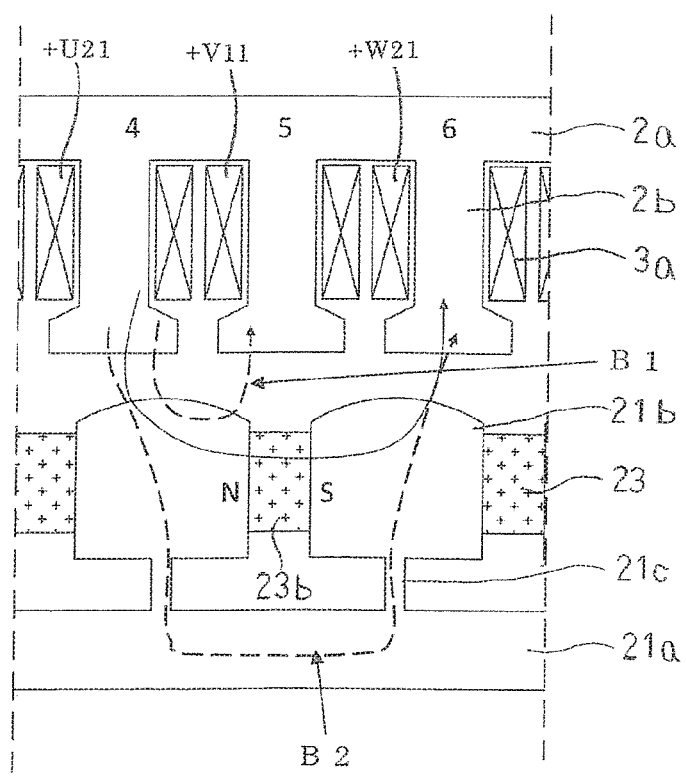
FIG. 27B is a schematic diagram that shows a state of the rotary electric machine at which demagnetizing fields are at a maximum during single-system driving in the electric driving apparatus according to Embodiment 7 of the present invention.

FIG. 26 is a lateral cross section that shows a rotary electric machine in an electric driving apparatus according to Embodiment 7 of the present invention, FIG. 27A is a schematic diagram that shows a state of the rotary electric machine at which demagnetizing fields are at a maximum during two-system driving in the electric driving apparatus according to Embodiment 7 of the present invention, and FIG. 27B is a schematic diagram that shows a state of the rotary electric machine at which demagnetizing fields are at a maximum during single-system driving in the electric driving apparatus according to Embodiment 7 of the present invention. Moreover, FIGS. 27A and 27B show states in which the stator and the rotor are opened out rectilinearly. Furthermore, to facilitate explanation, in FIGS. 27A and 27B, numbering 23b is applied to the permanent magnets that interlink with the magnetic flux that arises due to the passage of electric current through the coils 3a.

In FIG. 26, a rotary electric machine 110F includes: a stator 1F; and a rotor 20F that has a rotor core 21F in which eight field pole portions 21b are arranged at a uniform angular pitch circumferentially. The stator 1F includes: a stator core 2D in which twelve teeth 2b are disposed at a uniform angular pitch circumferentially so as to each protrude radially inward from an inner circumferential surface of the annular core back 2a; and an armature winding 3F that includes twelve coils 3a that are wound onto each of the teeth 2b. The rotor 20F is configured in a similar or identical manner to the rotor 20 according to Embodiment 1 except that eight permanent magnets 23 are disposed at a uniform angular pitch circumferentially, that is, the number of magnetic field poles is eight. This rotary electric machine 110F is an 8-pole 12-tooth rotary electric machine, and is driven and controlled in a similar or identical manner to Embodiment 1 above by a controlling circuit board 123.

The armature winding 3F will now be explained. The U phase is constituted by four coils 3a, i.e., +U11, +U21, +U12, and +U22, the V phase is constituted by four coils 3a, i.e., +V21, +V11, +V22, and +V12, and the W phase is constituted by four coils 3a, i.e., +W11, +W21, +W12, and +W22. As shown in FIG. 26, the twelve coils 3a line up sequentially in order of +U11, +V21, +W11, +U21, +V11, +W21, +U12, +V22, +W12, +U22, +V12, and +W22 so as to correspond to each of the teeth 2b that have numbering 1 through 12. Moreover, "+" and "−" indicate winding polarities of the coils 3a, the "+" winding polarity being opposite to the "−" winding polarity. The number of turns in all of the coils 3a is identical.

+U11 and +U12 are connected in series to constitute a U1 phase which is a first U-phase winding. +U21 and +U22 are connected in series to constitute a U2 phase which is a second U-phase winding. +V11 and +V12 are connected in series to constitute a V1 phase which is a first V-phase winding. +V21 and +V22 are connected in series to constitute a V2 phase which is a second V-phase winding. +W11 and +W12 are connected in series to constitute a W1 phase which is a first W-phase winding. −W21 and +W22 are connected in series to constitute a W2 phase which is a second W-phase winding.

In a first connecting method, a first armature winding is formed by wye-connecting the U1 phase, the V1 phase, and the W1 phase. A second armature winding is similarly formed by wye-connecting the U2 phase, the V2 phase, and the W2 phase.

In a second connecting method, a first armature winding is formed by delta-connecting the U1 phase, the V1 phase, and the W1 phase. A second armature winding is similarly formed by delta-connecting the U2 phase, the V2 phase, and the W2 phase.

In Embodiment 7, the first armature winding and the second armature winding are also not electrically connected to each other. The coils 3a that constitute the first armature winding and the coils 3a that constitute the second armature winding are disposed so as to alternate circumferentially.

In two-system driving, when the permanent magnets 23b are disposed approximately centrally between the adjacent teeth 2b, as shown in FIG. 27A, the difference between the magnetomotive forces of the coils 3a that are wound onto the teeth 2b that are disposed on the N pole side and the S pole side of the permanent magnets 23b is large. Thus, as indicated by the arrows in FIG. 27A, the magnetic flux that enters the permanent magnet 23b from the N-pole field pole portion 21b and passes out of the permanent magnet 23b to the S-pole field pole portion 21b is at a maximum, and the demagnetizing fields are also at a maximum.

In single-system driving, as shown in FIG. 27B, the difference between the magnetomotive forces of the coils 3a that are wound onto the teeth 2b that are one tooth apart, that are disposed on the N pole side and the S pole side of the permanent magnets 23b is large, maximizing the demagnetizing fields. Moreover, among the U-, V-, and W-phase three-phase alternating-currents that are passed through the coils 3a, the inverter phase currents are supplied such that the U-phase current and the W-phase current are equal.

Thus, as indicated by a solid arrow in FIG. 27B, magnetic flux that is generated by the coil 3a that is wound onto the tooth 2b at Number 4 flows so as to pass through an N-pole field pole portion 21b and enter a permanent magnet 23b, enter an S-pole field pole portion 21b from the permanent magnet 23b, and enter the tooth 2b at Number 6 from the field pole portion 21b. Here, as indicated by a broken arrow in FIG. 27B, a portion of the magnetic flux that is generated by the coil 3a that is wound onto the tooth 2b at Number 4 passes through the N-pole field pole portion 21b, flows to the tooth 2b at Number 5, and becomes tooth magnetic leakage flux. As indicated by a broken arrow in FIG. 27B, a portion of the magnetic flux that is generated by the coil 3a that is wound onto the tooth 2b at Number 4 also passes through the N-pole field pole portion 21b, a bridge portion 21c, the annular portion 21a, a bridge portion 21c, and the S-pole field pole portion 21b and flows to the tooth 2b at Number 6, becoming bridge portion magnetic leakage flux. The amount of magnetic flux that interlinks the permanent magnets 23b is thereby reduced, enabling demagnetizing fields that arise in the permanent magnets 23b to be reduced.

Thus, in Embodiment 7, since tooth magnetic leakage flux that leaks into the central tooth 2b and bridge portion magnetic leakage flux B2 that passes through the bridge portions 21c is also generated in a similar or identical manner to Embodiment 1 above, the effects of demagnetizing fields can be further reduced.

Embodiment 8

Figure 28:
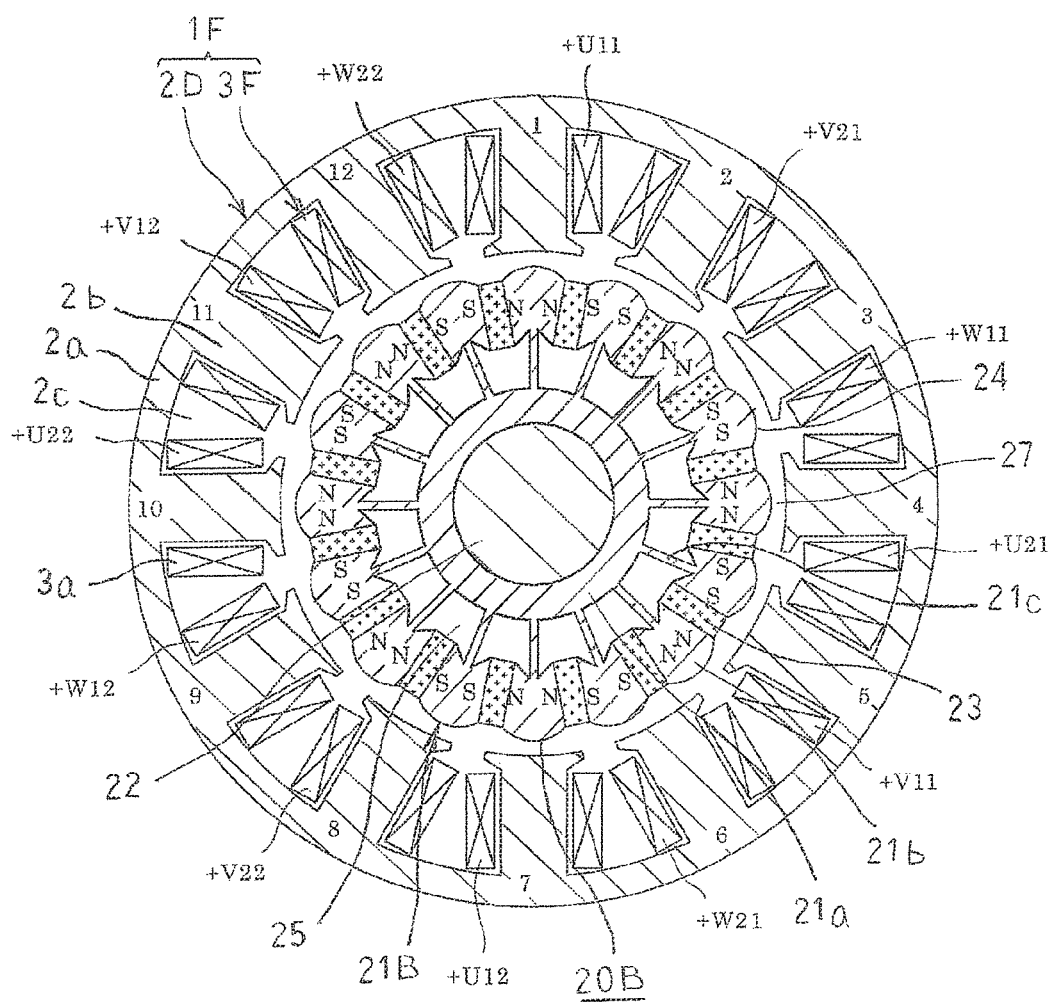
FIG. 28 is a lateral cross section that shows a rotary electric machine in an electric driving apparatus according to Embodiment 8 of the present invention.

FIG. 28 is a lateral cross section that shows a rotary electric machine in an electric driving apparatus according to Embodiment 8 of the present invention.

In FIG. 28, a rotary electric machine 110E includes a stator 1F, and a rotor 20B. The rotor 20B is configured in a similar or identical manner to the rotor 20F according to Embodiment 7 except that sixteen permanent magnets 23 are disposed at a uniform angular pitch circumferentially, that is, the number of magnetic field poles is sixteen. This rotary electric machine 110E is a 16-pole 12-tooth rotary electric machine, and is driven and controlled in a similar or identical manner to Embodiment 7 above by a controlling circuit board 123.

In the rotary electric machine 110G, because a relationship in which the number of magnetic field poles P is greater than the number of teeth N, in other words, P/N≥1.0, demagnetizing fields that arise in the permanent magnets 23 can be reduced further than in Embodiment 7 above.

Moreover, in Embodiment 7 above, a rotary electric machine is used in which the number of magnetic field poles is eight and the number of teeth is twelve, and in Embodiment 8 above, a rotary electric machine is used in which the number of magnetic field poles is sixteen and the number of teeth is twelve. In the configurations according to Embodiments 7 and 8 above, if the phases of the armature winding are taken into consideration, the arrangement of the field poles and the coils is rotatable by 180 degrees in a circumferential direction. Consequently, similar or identical effects can also be achieved using a rotary electric machine that has half the number of magnetic field poles and half the number of teeth, that is, the number of magnetic field poles is four or eight, and the number of teeth is six. It goes without saying that similar or identical effects can be achieved if a rotary electric machine is used in which the rotational symmetry number in the circumferential direction is increased, in other words, the number of magnetic field poles is (6±2)n and the number of teeth is 6n, where n is a positive integer. In Embodiments 7 and 8 above, the first armature winding and the second armature winding are three-phase connected windings, but it goes without saying that effects that are similar or identical can be achieved even if the first armature winding and the second armature winding are windings in which more than three phases, such as five phases, seven phase, nine phases, etc., are connected.

Embodiment 9

Figure 29:
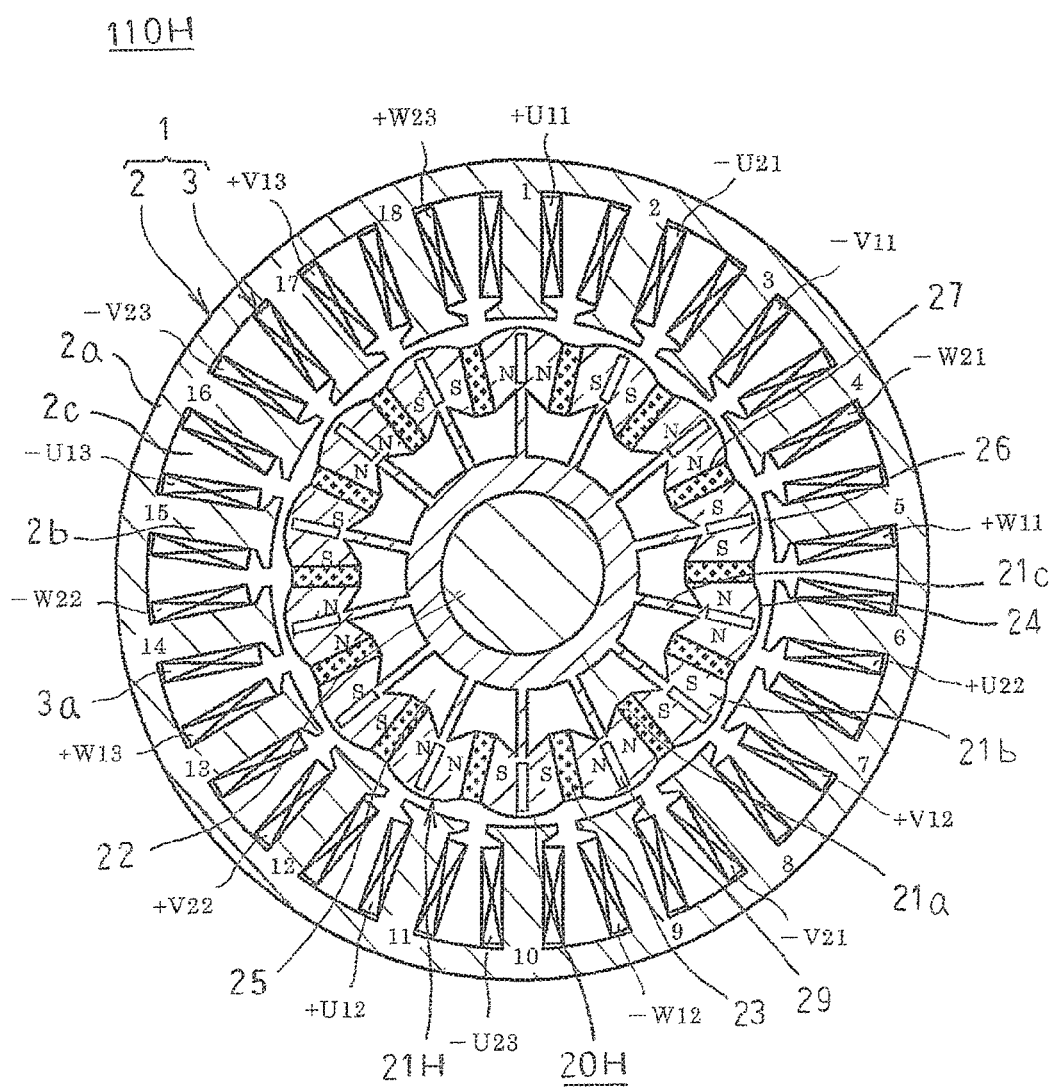
FIG. 29 is a lateral cross section that shows a rotary electric machine in an electric driving apparatus according to Embodiment 9 of the present invention.
Figure 30A:
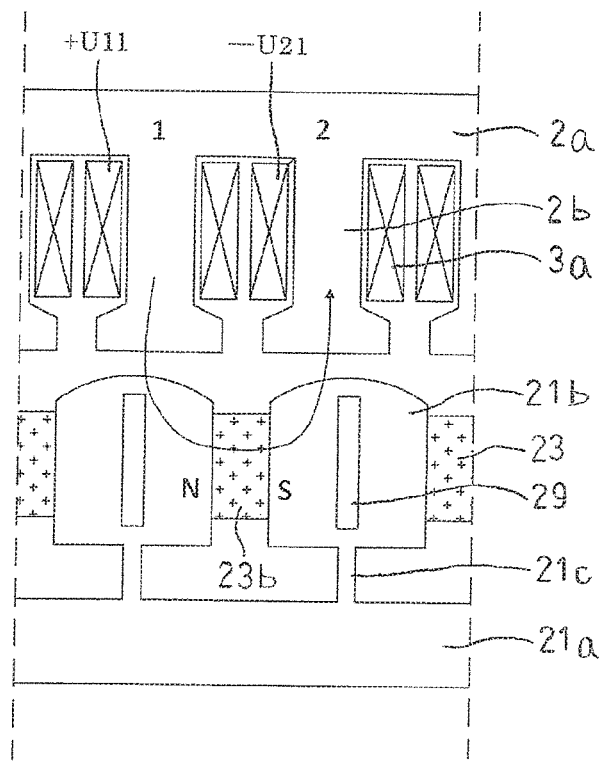
FIG. 30A is a schematic diagram that shows a state of the rotary electric machine at which demagnetizing fields are at a maximum during two-system driving in the electric driving apparatus according to Embodiment 9 of the present invention.
Figure 30B:
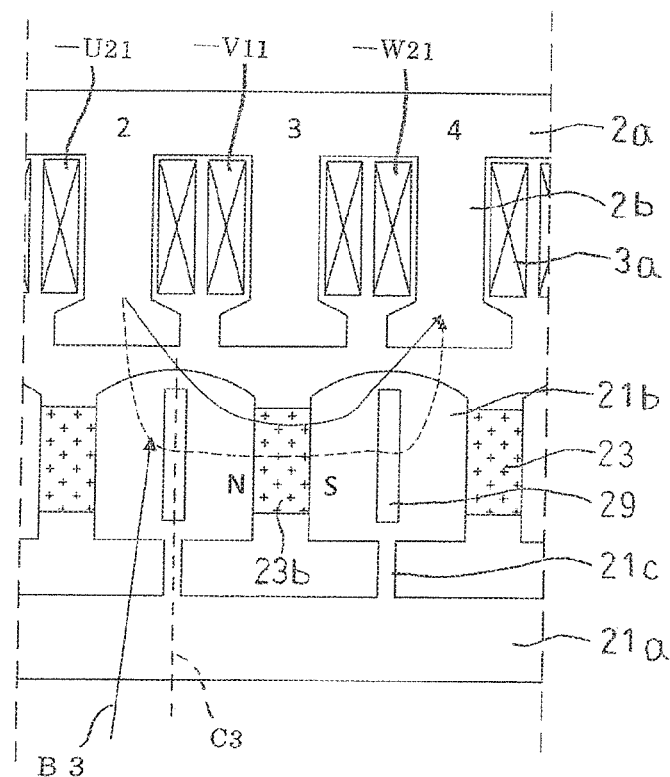
FIG. 30B is a schematic diagram that shows a state of the rotary electric machine at which demagnetizing fields are at a maximum during single-system driving in the electric driving apparatus according to Embodiment 9 of the present invention.

FIG. 29 is a lateral cross section that shows a rotary electric machine in an electric driving apparatus according to Embodiment 9 of the present invention, FIG. 30A is a schematic diagram that shows a state of the rotary electric machine at which demagnetizing fields are at a maximum during two-system driving in the electric driving apparatus according to Embodiment 9 of the present invention, and FIG. 30B is a schematic diagram that shows a state of the rotary electric machine at which demagnetizing fields are at a maximum during single-system driving in the electric driving apparatus according to Embodiment 9 of the present invention. Moreover, FIGS. 30A and 30B show states in which the stator and the rotor are opened out rectilinearly. Furthermore, to facilitate explanation, in FIGS. 30A and 30B, numbering 23b is applied to the permanent magnets that interlink with the magnetic flux that arises due to the passage of electric current through the coils 3a.

In FIG. 29, a rotary electric machine 110H includes: a stator 1; and a rotor 20H that has a rotor core 21H in which fourteen field pole portions 21b are arranged at a uniform angular pitch circumferentially, low magnetic permeability portions 29 being formed on each of the field pole portions 21b. The low magnetic permeability portions 29 are constituted by passage apertures that pass axially through a circumferentially central portion of each of the magnetic pole portions 21b. The rotor 20F is configured in a similar or identical manner to the rotor 20 according to Embodiment 1 except that the low magnetic permeability portions 29 are included on each of the field pole portions 21b. This rotary electric machine 110H is a 14-pole 18-tooth rotary electric machine, and is driven and controlled in a similar or identical manner to Embodiment 1 above by a controlling circuit board 123.

One low magnetic permeability portion 29 is formed on each of the field pole portions 21b so as to extend radially from a radially inner side toward a radially outer side along a center line C3 of the field pole portion 21*b*. Since the low magnetic permeability portions 29 are formed so as to have a shape that has mirror symmetry relative to the center lines C3 of the field pole portions 21*b*, the properties of the rotary electric machine 110H effectively do not change even if the direction of rotation of the rotary electric machine 110H changes.

Moreover, in Embodiment 9, the low magnetic permeability portions 29 are constituted by air gap portions that pass axially through the circumferentially central portions of the field pole portions 21*b*, but it is only necessary for the low magnetic permeability portions 29 to have lower magnetic permeability than the field pole portions 21*b*, and non-magnetic body may alternatively fill the air gap portions in question to constitute the low magnetic permeability portions, or magnetic permeability of the circumferentially central portion of the field pole portions 21*b* may alternatively be reduced by applying pressure to the field pole portions 21*b* to constitute the low magnetic permeability portions.

In two-system driving, when the permanent magnets 23*b* are disposed approximately centrally between the adjacent teeth 2*b*, as shown in FIG. 30A, the difference between the magnetomotive forces of the coils 3*a* that are wound onto the teeth 2*b* that are disposed on the N pole side and the S pole side of the permanent magnets 23*b* is large. Thus, as indicated by the arrows in FIG. 30A, the magnetic flux that enters the permanent magnet 23*b* from the N-pole field pole portion 21*b* and passes out of the permanent magnet 23*b* to the S-pole field pole portion 21*b* is at a maximum, and the demagnetizing fields that arise in the permanent magnets 23 are also at a maximum.

In single-system driving, as shown in FIG. 30B, the difference between the magnetomotive forces of the coils 3*a* that are wound onto the teeth 2*b* that are one tooth apart, that are disposed on the N pole side and the S pole side of the permanent magnets 23*b* is large, maximizing the demagnetizing fields that arise in the permanent magnets 23. Moreover, among the U-, V-, and W-phase three-phase alternating-currents that are passed through the coils 3*a*, the inverter phase currents are supplied such that the U-phase current and the W-phase current are equal.

Thus, as indicated by a solid arrow in FIG. 30B, magnetic flux that is generated by the coil 3*a* that is wound onto the tooth 2*b* at Number 2 flows so as to pass radially outside an N-pole field pole portion 21*b* and enter a permanent magnet 23*b*, passes radially outside an S-pole field pole portion 21*b* from the permanent magnet 23*b*, and enter the tooth 2*b* at Number 4 from the field pole portion 21*b*.

Thus, in Embodiment 9, since tooth magnetic leakage flux that leaks into the central tooth 2*b* and bridge portion magnetic leakage flux B2 that passes through the bridge portions 21*c* is also generated in a similar or identical manner to Embodiment 1 above, demagnetizing fields that arise in the permanent magnets 23 can be reduced.

In addition, as indicated by a broken arrow B3 in FIG. 30B, because the low magnetic permeability portions 29 exist in a magnetic path that flows through a permanent magnet 23*b* so as to pass through a radially central portion of the N-pole field pole portion 21*b*, the amount of magnetic flux that interlinks the permanent magnets 23 is reduced by the low magnetic permeability portions 29, enabling the demagnetizing fields that arise in the permanent magnets 23 to be further reduced.

Because the magnetic flux from the permanent magnets 23, on the other hand, arises radially from the permanent magnets 23, the magnetic flux of the permanent magnets 23 is not reduced by the low magnetic permeability portions 29. Demagnetizing fields that arise in the permanent magnets 23 can thereby be reduced without reducing the amount of magnetic flux that is generated by the permanent magnets 23.

Moreover, in Embodiment 9 above, low magnetic permeability portions are formed on circumferentially central portions of field pole portions, but similar or identical effects can also be achieved if the low magnetic permeability portions are disposed at positions other than the circumferentially central portions of the field pole portions.

In Embodiment 9 above, one low magnetic permeability portion is formed on each of the field pole portions, but the number of low magnetic permeability portions that is formed on each of the field pole portions may alternatively be two or more.

In Embodiment 9 above, the low magnetic permeability portions are formed on the field pole portions of the rotor according to Embodiment 1, but similar or identical effects can also be achieved if the low magnetic permeability portions are formed on the field pole portions of rotors according to the other embodiments.

In each of the above embodiments, each of the field pole portions is linked mechanically to an annular portion by bridge portions, and are connected to each other magnetically, but it goes without saying that similar or identical effects can also be achieved if a plurality of field pole portions are separated from each other magnetically.

In each of the above embodiments, the permanent magnets are configured so as to have shapes in which a radial length is longer than a circumferential length, but the permanent magnets may alternatively be configured so as to have shapes in which the circumferential length is longer than the radial length. In that case, tolerance against irreversible demagnetization when demagnetizing fields arise in the permanent magnets can effectively be further improved.

In each of the above embodiments, the respective phase windings of the first armature winding and the second armature winding are configured by connecting three coils or two coils in series, specifically, three in series, one in parallel, or two in series, one in parallel, but the parallel or series relationships of the coils that constitute the respective phase windings are not limited to three in series, one in parallel, or to two in series, one in parallel.

In each of the above embodiments, the numbers of turns in the coils are all equal, but the number of turns in the coils may be different on each tooth. In other words, similar or identical effects can also be achieved during inverter failure if the number of turns in the coils is different on each tooth, since the magnetomotive forces from the coils that are wound onto teeth that are separated by one tooth are lower than the difference in magnetomotive force between coils that are wound onto adjacent teeth, or the demagnetizing fields that arise in the permanent magnets are reduced due to magnetic leakage flux.

EXPLANATION OF NUMBERING 1, 1D, STATOR; 2, 2D STATOR CORE; 2*a* CORE BACK; 2*b* TOOTH; 3*a* COIL; 20, 20A, 20B, 20C, 20D, 20F, 20H ROTOR; 21, 21A, 21B, 21C, 21D, 21F, 21H ROTOR CORE; 21*b* FIELD POLE PORTION; 21*c* BRIDGE PORTION; 23 PERMANENT MAGNET; 24 CURVED SURFACE PORTION; 25 NONMAGNETIC PORTION; 26 MAGNETIC AIR GAP PORTION; 29 LOW MAGNETIC PERMEABILITY PORTION; 110, 110A, 110B, 110C, 110D, 110E, 110F, 110G, 110H ROTARY

ELECTRIC MACHINE; 120 CONTROLLING APPARATUS; 123 CONTROLLING CIRCUIT BOARD (CONTROL PORTION); 301, 301A, 303, 303A FIRST ARMATURE WINDING; 302, 302A, 304, 304A SECOND ARMATURE WINDING; 305 FIRST INVERTER; 306 SECOND INVERTER.

The invention claimed is:

1. An electric driving apparatus comprising:
a rotary electric machine that comprises:
  a stator that comprises:
    a stator core in which a plurality of teeth are arranged in a circumferential direction such that each protrudes radially inward from an inner circumferential surface of an annular core back; and
    a first armature winding and a second armature winding that are configured by connecting a plurality of coils that are wound into concentrated windings on each of said teeth, said first armature winding and said second armature winding not being connected to each other electrically;
  a rotor that comprises:
    a plurality of permanent magnets that are disposed in a circumferential direction so as to be spaced apart from each other, and so as to have directions of magnetization oriented in said circumferential direction;
    a plurality of field pole portions that are disposed between respective adjacent pairs of permanent magnets; and
    a plurality of nonmagnetic portions that are disposed on a radially inner side of said permanent magnets so as to contact each of said plurality of permanent magnets,
  said rotor being disposed radially inside said stator core so as to have a magnetic air gap portion interposed; and
a controlling apparatus that comprises:
  a first inverter that supplies inverter phase currents to said first armature winding;
  a second inverter that supplies inverter phase currents to said second armature winding; and
  a control portion that controls driving of said first inverter and said second inverter,
wherein:
coils that constitute said first armature winding and coils that constitute said second armature winding are arranged so as to alternate in said circumferential direction;
said control portion is configured so as to:
  perform two-system driving when a first system that comprises said first armature winding and said first inverter and a second system that comprises said second armature winding and said second inverter are normal, said two-system driving controlling driving of said first inverter and said second inverter to supply said inverter phase currents to said first armature winding and said second armature winding such that said inverter phase currents are set to a first upper limit value, and
  perform single-system driving when one of said first system and said second system fails, said single-system driving stopping driving of said inverter of said system that has failed, and controlling driving of said inverter of said system that has not failed to supply said inverter phase currents to said armature winding of said system that has not failed such that said inverter phase currents are set to a second upper limit value that is greater than said first upper limit value,
wherein during said single-system driving said second upper limit value of the inverter phase currents is set to a value that is greater than a value of inverter phase currents that place demagnetizing fields that arise in said permanent magnets in an irreversibly demagnetizing field region during said two-system driving.

2. The electric driving apparatus according to claim 1, wherein said second upper limit value is greater than one times said first upper limit value and less than or equal to two times said first upper limit value.

3. The electric driving apparatus according to claim 1, wherein said plurality of field pole portions are linked by bridge portions that are constituted by magnetic bodies.

4. The electric driving apparatus according to claim 1, wherein respective surfaces of said plurality of field pole portions that face said stator are formed so as to have curved surfaces that have radially outwardly convex shapes that minimize an air gap length from said stator at intermediate positions between adjacent permanent magnets.

5. The electric driving apparatus according to claim 1, wherein a number of field poles is greater than or equal to a number of said teeth.

6. The electric driving apparatus according to claim 1, wherein:

$P=(18\pm4)n$; and $N=18n$ where P is said number of field poles, N is said number of said teeth, and n is a positive integer.

7. The electric driving apparatus according to claim 1, wherein:

$P=(18\pm2)n$; and $N=18n$ where P is said number of field poles, N is said number of said teeth, and n is a positive integer.

8. The electric driving apparatus according to claim 1, wherein:

$P=(12\pm2)n$; and $N=12n$ where P is said number of field poles, N is said number of said teeth, and n is a positive integer.

9. The electric driving apparatus according to claim 1, wherein:

$P=(6\pm2)n$; and $N=6n$ where P is said number of field poles, N is said number of said teeth, and n is a positive integer.

10. The electric driving apparatus according to claim 1, wherein a low magnetic permeability portion is formed on each of said plurality of field pole portions so as to extend in a radial direction and to extend from a first axial end to a second axial end.

11. An electric power steering apparatus to which the electric driving apparatus according to claim 1 is mounted.

* * * * *